United States Patent
Matsunaga

(10) Patent No.: US 8,447,455 B2
(45) Date of Patent: May 21, 2013

(54) TARGET ROUTE GENERATION SYSTEM

(75) Inventor: Shinichi Matsunaga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 818 days.

(21) Appl. No.: 12/666,485

(22) PCT Filed: Oct. 24, 2008

(86) PCT No.: PCT/JP2008/003022
§ 371 (c)(1),
(2), (4) Date: Dec. 23, 2009

(87) PCT Pub. No.: WO2009/075053
PCT Pub. Date: Jun. 18, 2009

(65) Prior Publication Data
US 2010/0174436 A1    Jul. 8, 2010

(30) Foreign Application Priority Data
Dec. 10, 2007  (JP) .................. 2007-318965

(51) Int. Cl.
*G01C 22/00* (2006.01)
*G05D 1/00* (2006.01)
*G06F 19/00* (2006.01)

(52) U.S. Cl.
USPC ............................. 701/26; 700/245

(58) Field of Classification Search
USPC ............................. 701/26; 700/245
See application file for complete search history.

(56) References Cited

U.S. PATENT DOCUMENTS

| 2004/0006416 A1* | 1/2004 | Jeong | 701/23 |
| 2004/0133308 A1* | 7/2004 | Kato et al. | 700/245 |
| 2006/0235610 A1* | 10/2006 | Ariyur et al. | 701/202 |

FOREIGN PATENT DOCUMENTS

| JP | 03-100709 | 4/1991 |
| JP | 03-285502 | 12/1991 |
| JP | 04-090009 | 3/1992 |
| JP | 04-340607 | 11/1992 |
| JP | 09-319433 | 12/1997 |
| JP | 2004-098233 | 4/2004 |
| JP | 2006-195969 | 7/2006 |

\* cited by examiner

*Primary Examiner* — Thomas Tarcza
*Assistant Examiner* — Imran Mustafa
(74) *Attorney, Agent, or Firm* — Rankin, Hill & Clark LLP

(57) ABSTRACT

A target route generation system which generates a target route for a robot (R) to travel along autonomously is provided with a route candidate generation element (110) which generates a plurality of travel route candidates to connect the terminating point and the starting point by connecting links stored at a link storing element (211), state recognition elements (115 to 118) which recognize a state of the robot (R), and a route evaluation IC element (120) which evaluates a cost of a travel route candidate including therein an action point stored in an action point storing element (212) lower as the necessity for passing by the action point is higher in view of the state of the robot (R) recognized by the state recognition elements (115 to 118). According to the system, the robot can be made to travel through the action point with a high necessity in view of the state of the robot.

12 Claims, 13 Drawing Sheets

TARGET ROUTE GENERATION SYSTEM

PRIORITY CLAIM

The present application is based on and claims the priority benefit of Japanese Patent Application 2007-318965 filed on Dec. 10, 2007, the contents of which are incorporated herein by reference in its entirety.

BACKGROUND OF THE INVENTION

1. Field of the Invention

The present invention relates to a target route generation system configured to generate a target route for a robot to travel along autonomously.

2. Description of the Related Art

Conventionally, there has been known a technical method (refer to Japanese Patent Laid-open No. 2006-195969) which generates travel route candidates by joining a present position of a robot capable of traveling autonomously and a destination position designated by a user through a plurality of nodes predefined as travel point candidates for the robot to travel through in a travel region.

According to the conventional method, the travel route candidates are generated under a condition that there is no obstacle in the connection line between the nodes and an interval between two adjacent nodes is equal to or smaller than a predefined threshold (5 m). The travel route with the shortest distance from the present position to the destination position of the robot among the travel route candidates is defined as the target route for the robot.

However, if the target route is defined according to the conventional method, it is possible that the robot will have to travel by deviating from some travel points which should be traveled through by the robot in view of a state of the robot.

On the other hand, if the travel points which should be traveled through by the robot are fixed, the robot may be forced to travel in a detoured route along some travel points with a low necessity in view of the state thereof.

SUMMARY OF THE INVENTION

The present invention has been accomplished in view of the aforementioned problems, and it is therefore an object of the present invention to provide a target route generation system capable of making a robot travel through a travel point with a high necessity in view of a state of the robot.

A first aspect of the present invention provides a target route generation system configured to generate a target route for a robot to travel along autonomously. The target route generation system of the first aspect comprises: a link storing element configured to store travelable links in a travel region for the robot; an action point storing element configured to store an action point between the robot and an external environment thereof in any of the links stored in the link storing element; a starting point recognition element configured to recognize a present position or departure position of the robot in the travel region as a starting point; a terminating point recognition element configured to recognize a destination position of the robot specified by a user in the travel region via an input device as a terminating point; a route candidate generation element configured to generate a plurality of travel route candidates which join the terminating point recognized by the terminating point recognition element and the starting point recognized by the starting point recognition element by way of joining the links stored in the link storing element; a state recognition element configured to recognize a state of the robot; and a route evaluation element configured to evaluate lower a cost of a travel route candidate including therein an action point stored in the action point storing element among the plurality of travel route candidates generated by the route candidate generation element as the necessity for passing by the action point increases in view of the state of the robot recognized by the state recognition elements, or to evaluate the cost thereof higher as the necessity decreases. The travel route candidate with the lowest total cost evaluated by the route evaluation element is generated as the target route.

According to the target route generation system of the first aspect of the present invention, the cost of a travel route candidate including therein an action point is evaluated lower as the necessity for passing by the action point by the robot increases in view of the state of the robot, or the cost thereof is evaluated higher as the necessity decreases. Herein, the action point is referred to as a point where the robot interacts with the external environment thereof directly or indirectly. The travel route candidate with the lowest cost is generated as the target route along which the robot travels autonomously. Accordingly, the robot can be made to travel to the terminating point by passing by the action point with a high necessity in view of its state and interacting with the external environment at the action point.

A second aspect of the present invention is dependent on the target route generation system of the first aspect, wherein at least a battery charging point is stored in the action point storing element for the robot as the action point; the state recognition element recognizes an estimated residual capacity of battery in relation to a travel distance to be traveled by the robot along the travel route candidate as the state of the robot; the route evaluation element evaluates the cost of a travel route candidate which satisfies a first charge requisite lower than the cost of the other travel route candidates which do not satisfy the first charge requisite according to the recognition result by the state recognition element; and the first charge requisite is so defined that the estimated residual capacity of battery to move the robot to the terminating point with the battery thereof uncharged is equal to or greater than a threshold.

According to the target route generation system of the second aspect of the present invention, the cost for a travel route candidate where the battery is not needed to be charged in view of the estimated residual capacity of battery at the terminating point of the robot is evaluated low. Thus, as aforementioned, the travel route candidate with the lowest cost is generated as the target route, and the robot travels to the terminating point autonomously along the target route. Consequently, the target route can be set at more freedom as the battery charging point will not have to be passed by the robot. As a result thereof, the robot can be made to travel flexibly in a travel behavior in accordance with the purpose thereof.

A third aspect of the target route generation system of the present invention is dependent on the target route generation system of the second aspect of the present invention, wherein the route evaluation element evaluates the cost of a travel route candidate which does not satisfy the first charge requisite but satisfies a second charge requisite lower than the cost of the other travel route candidates which do not satisfy the second charge requisite according to the recognition result by the state recognition element; and the second charge requisite is so defined that the estimated residual capacity of battery used to move the robot to the terminating point becomes equal to or greater than the threshold after the battery is charged at a battery charging point included in the travel route candidate.

According to the target route generation system of the third aspect of the present invention, when no travel route where the battery is not needed to be charged is present, the cost of a travel route candidate including a battery charging point which is needed to be passed by the robot in view of the estimated residual capacity of battery in the halfway is evaluated low. Thus, as aforementioned, the travel route candidate with the lowest cost is generated as the target route, and the robot travels to the terminating point autonomously along the target route. Thereby, the robot is made to pass by a battery charging point which is needed to be passed by in view of the estimated residual capacity of battery at the terminating point, and the robot can be made to travel to the terminating point with the battery thereof charged at the battery charging point.

A fourth aspect of the present invention is dependent on the target route generation system of the third aspect of the present invention, wherein the less the estimated residual capacity of battery at the battery charging point is, the lower the route evaluate element evaluates the cost of the travel route candidate satisfying the second charge requisite according to the recognition result by the state recognition element.

According to the target route generation system of the fourth aspect of the present invention, when a travel route candidate including a battery charging point is evaluated, the higher the necessity for the robot to pass by the battery charging point in view of the estimated residual capacity of battery in the halfway is, the lower the cost thereof will be evaluated. Thus, as aforementioned, the travel route candidate with the lowest cost is generated as the target route, and the robot travels to the terminating point autonomously along the target route. Thereby, the robot is made to pass by a battery charging point with a high necessity in view of the estimated residual capacity of battery at the terminating point, and the robot can be made travel to the terminating point with the battery thereof charged at the battery charging point.

A fifth aspect of the present invention is dependent on the target route generation system of the first aspect of the present invention, wherein the action point stored in the action point storing element includes at least a position or posture correction point for the robot, the state recognition element recognizes an estimated deviation of a position or posture of the robot from a target position or posture thereof in relation to a travel distance to be traveled by the robot along the travel route candidate as the state of the robot, the route evaluation element evaluates the cost of a travel route candidate which satisfies a first correction requisite lower than the cost of the other travel route candidates which do not satisfy the first correction requisite according to the recognition result by the state recognition element; and the first correction requisite is so defined that the estimated deviation used to move the robot to the terminating point with the position or posture thereof uncorrected is equal to or smaller than a threshold.

According to the target route generation system of the fifth aspect of the present invention, when the robot is moved to the terminating point with the position or posture thereof uncorrected along a travel route candidate with the estimated deviation thereof equal to or smaller than the threshold, the cost thereof is evaluated lower. Thus, as aforementioned, the travel route candidate with the lowest cost is generated as the target route, and the robot travels to the terminating point autonomously along the target route. Consequently, the target route can be set at more freedom as the correction point will not have to be passed by the robot. As a result thereof, the robot can be made to travel flexibly in a travel behavior in accordance with the purpose thereof.

A sixth aspect of the present invention is dependent on the target route generation system of the fifth aspect of the present invention, wherein the route evaluation element evaluates the cost of a travel route candidate which does not satisfy the first correction requisite but satisfies a second correction requisite lower than the cost of the other travel route candidates which do not satisfy the second correction requisite according to the recognition result by the state recognition element; and the second correction requisite is so defined that the estimated deviation when the robot is moved to the terminating point becomes equal to or smaller than the threshold after the position or posture of the robot is corrected at a correction point included in the travel route candidate.

According to the target route generation system of the sixth aspect of the present invention, when no travel route where the correction is not needed is present, the cost of a travel route candidate including a correction point which should be passed by the robot in view of the estimated deviation in the halfway is evaluated low. Thus, as aforementioned, the travel route candidate with the lowest cost is generated as the target route, and the robot travels to the terminating point autonomously along the target route. Thereby, the robot is made to pass by a correction point which is needed to be passed by in view of the estimated deviation at the terminating point, and the robot can be made to travel to the terminating point with the position or posture thereof corrected at the correction point.

A seventh aspect of the present invention is dependent on the target route generation system of the sixth aspect of the present invention, wherein the greater the estimated deviation at the correction point is, the lower the route evaluate element evaluates the cost of the travel route candidate satisfying the second correction requisite according to the recognition result by the state recognition element.

According to the target route generation system of the seventh aspect of the present invention, when a travel route candidate including a correction point is evaluated, the higher the necessity for the robot to pass by the correction point in view of the estimated deviation in the halfway is, the lower the cost thereof will be evaluated. Thus, as aforementioned, the travel route candidate with the lowest cost is generated as the target route, and the robot travels to the terminating point autonomously along the target route. Thereby, the robot is made to pass by a correction point with a high necessity in view of the estimated deviation at the terminating point, and the robot can be made to travel to the terminating point with the position or posture thereof corrected at the correction point.

An eighth aspect of the present invention is dependent on the target route generation system of the first aspect of the present invention, wherein at least a task execution point is stored in the action point storing element for the robot as the action point; the state recognition element recognizes a task information denoting at least a task execution point where a task is being executed or is scheduled to be executed by the robot as the state of the robot; and the route evaluation element evaluates the cost of a travel route candidate which satisfies a task requisite that a task execution point is included therein lower than the cost of the other travel route candidates which do not satisfy the task requisite according to the recognition result by the state recognition element.

According to the target route generation system of the eighth aspect of the present invention, the cost of a travel route candidate including a task execution point which is needed to be passed by the robot in view of the task information is evaluated low. Thus, as aforementioned, the travel route candidate with the lowest cost is generated as the target route, and the robot travels to the terminating point autonomously along the target route. Thereby, the robot can be made to pass by a task execution point which is needed to be passed by the robot in view of the task which is being executed or is scheduled to be executed at the task execution point to travel to the terminating point.

A ninth aspect of the present invention is dependent on the target route generation system of the first aspect of the present invention, wherein at least a battery charging point and a task execution point is stored in the action point storing element for the robot as the action point; the state recognition element recognizes an estimated residual capacity of battery in relation to a travel distance to be traveled by the robot along the travel route candidate and a task information denoting at least a task execution point where a task is being executed or is scheduled to be executed by the robot as the state of the robot; the route evaluation element evaluates the cost of a travel route candidate which satisfies a third charge requisite lower than the cost of the other travel route candidates which do not satisfy the third charge requisite according to the recognition result by the state recognition element; and the third charge requisite is so defined that the estimated residual capacity of battery used to move the robot to the task execution point with the battery thereof uncharged is equal to or greater than a threshold which is defined according to the contents of the task.

According to the target route generation system of the ninth aspect of the present invention, the cost for a travel route candidate where the battery is not needed to be charged in view of the estimated residual capacity of battery at the task execution point of the robot is evaluated low. Thus, as aforementioned, the travel route candidate with the lowest cost is generated as the target route, and the robot travels to the terminating point autonomously along the target route by passing by the task execution point. Consequently, the target route can be set at more freedom as the battery charging point will not have to be passed by the robot. As a result thereof, the robot can be made to travel flexibly in a travel behavior in accordance with the purpose thereof.

A tenth aspect of the present invention is dependent on the target route generation system of the ninth aspect of the present invention, wherein the route evaluation element evaluates the cost of a travel route candidate which does not satisfy the third charge requisite but satisfies a fourth charge requisite lower than the cost of the other travel route candidates which do not satisfy the fourth charge requisite according to the recognition result by the state recognition element; and the fourth charge requisite is so defined that the estimated residual capacity of battery used to move the robot to the task execution point becomes equal to or greater than the threshold after the battery is charged at a battery charging point included in the travel route candidate.

According to the target route generation system of the tenth aspect of the present invention, when no travel route satisfying the third charge requisite is present, the cost of a travel route candidate including a battery charging point which is needed to be passed by the robot in view of the estimated residual capacity of battery at a task execution point of the robot is evaluated low. Thereby, the robot can be made to pass by the battery charging point where the battery thereof is needed to be charged in order to execute the task.

An eleventh aspect of the present invention is dependent on the target route generation system of the tenth aspect of the present invention, wherein the less the estimated residual capacity of battery at the battery charging point is, the lower the route evaluate element evaluates the cost of the travel route candidate satisfying the fourth charge requisite according to the recognition result by the state recognition element.

According to the target route generation system of the eleventh aspect of the present invention, when a travel route candidate including a battery charging point is evaluated, the higher the necessity for the robot to pass by the battery charging point in view of the estimated residual capacity of battery at the task execution point of the robot is, the lower the cost thereof will be evaluated. Thereby, the robot can be made to pass by the battery charging point with a high necessity that the battery thereof is needed to be charged in order to execute the task.

A twelfth aspect of the present invention is dependent on the target route generation system of the first aspect of the present invention, wherein at least a position or posture correction point and a task execution point is stored in the action point storing element for the robot as the action point; the state recognition element recognizes an estimated deviation of a position or posture of the robot from a target position or posture thereof in relation to a travel distance to be traveled by the robot along the travel route candidate and a task information denoting at least a task execution point where a task is being executed or is scheduled to be executed by the robot as the state of the robot; the route evaluation element evaluates the cost of a travel route candidate which satisfies a third correction requisite lower than the cost of the other travel route candidates which do not satisfy the third charge requisite according to the recognition result by the state recognition element; and the third correction requisite is so defined that the estimated deviation when the robot is moved to the task execution point with the position or posture thereof uncorrected is equal to or smaller than a threshold which is defined according to the contents of the task.

According to the target route generation system of the twelfth aspect of the present invention, when the robot is moved to the terminating point along a travel route candidate with the position or posture thereof uncorrected, the cost thereof is evaluated lower in view of the estimated deviation at a task execution point of the robot. Thus, as aforementioned, the travel route candidate with the lowest cost is generated as the target route, and the robot travels to the terminating point autonomously along the target route by passing by the task execution point. Consequently, the target route can be set at more freedom as the correction point will not have to be passed by the robot. As a result thereof, the robot can be made to travel flexibly in a travel behavior in accordance with the purpose thereof.

A thirteenth aspect of the present invention is dependent on the target route generation system of the twelfth aspect of the present invention, wherein the route evaluation element evaluates the cost of a travel route candidate which does not satisfy the third correction requisite but satisfies a fourth correction requisite lower than the cost of the other travel route candidates which do not satisfy the fourth correction requisite according to the recognition result by the state recognition element; and the fourth correction requisite is so defined that the estimated deviation when the robot is moved to the task execution point becomes equal to or smaller than the threshold after the position or posture thereof is corrected at a correction point included in the travel route candidate.

According to the target route generation system of the thirteenth aspect of the present invention, when no travel route satisfying the third correction requisite is present, the cost of a travel route candidate including a correction point which is needed to be passed by the robot in view of the estimated deviation at a task execution point of the robot is evaluated low. Thereby, the robot can be made to pass by the correction point where the position or posture thereof is needed to be corrected in accordance with the deviation of accuracy needed to execute the task.

A fourteenth aspect of the present invention is dependent on the target route generation system of the thirteenth aspect of the present invention, wherein the greater the estimated deviation at the correction point is, the lower the route evaluate element evaluates the cost of the travel route candidate satisfying the fourth correction requisite according to the recognition result by the state recognition element.

According to the target route generation system of the fourteenth aspect of the present invention, when a travel route candidate including a correction point is evaluated, the higher the necessity for the robot to pass by the correction point in view of the estimated deviation at the task execution point of the robot is, the lower the cost thereof will be evaluated. Thereby, the robot can be made to pass by the correction point where the position or posture thereof should be corrected in accordance with the deviation of accuracy needed to execute the task.

A fifteenth aspect of the present invention provides a target route generation system configured to generate a target route for a robot to travel along autonomously. The target route generation system of the fifteenth aspect comprises: a link storing element configured to store travelable links in a travel region for the robot; an action point storing element configured to store an action point between the robot and an external environment thereof in any of the links stored in the link storing element; a starting point recognition element configured to recognize a present position or departure position of the robot in the travel region as a starting point; a terminating point recognition element configured to recognize a destination position of the robot specified by a user in the travel region via an input device as a terminating point; a route candidate generation element configured to generate a plurality of travel route candidates which join the terminating point recognized by the terminating point recognition element and the starting point recognized by the starting point recognition element by way of joining the links stored in the link storing element; a state recognition element configured to recognize a state of the robot; a route evaluation element configured to evaluate lower a cost of a travel route candidate including therein an action point stored in the action point storing element among the plurality of travel route candidates generated by the route candidate generation element as the necessity for passing by the action point increases in view of the state of the robot recognized by the state recognition elements; the travel route candidate with the lowest total cost evaluated by the route evaluation element is generated as the target route; and a part of or the entire part of the link storing element, the action point storing element, the starting point recognition element, the terminating point recognition element, the route candidate generation element, the state recognition element and the route evaluation element are disposed in the robot, and the other elements which are not disposed in the robot are disposed in a support server which provides information to the robot through communication with the robot.

According to the target route generation system of the fifteenth aspect of the present invention, the cost of a travel route candidate including therein an action point is evaluated lower as the necessity for passing by the action point by the robot increases in view of the state of the robot. Herein, the action point is referred to as a point where the robot interacts with the external environment thereof directly or indirectly. The travel route candidate with the lowest cost is generated as the target route where the robot travels autonomously. Accordingly, the robot can be made to travel to the terminating point by passing by the action point with a high necessity in view of its state and interacting with the external environment at the action point.

Moreover, according to the target route generation system of the fifteenth aspect of the present invention, the information processing load in the robot can be reduced through distributed processing performed in the robot and the server.

DETAILED DESCRIPTION OF THE PREFERRED EMBODIMENTS

Hereinafter, an embodiment of a target route generation system according to the present invention will be described with reference to FIG. 1 through FIG. 13.

Figure 1:
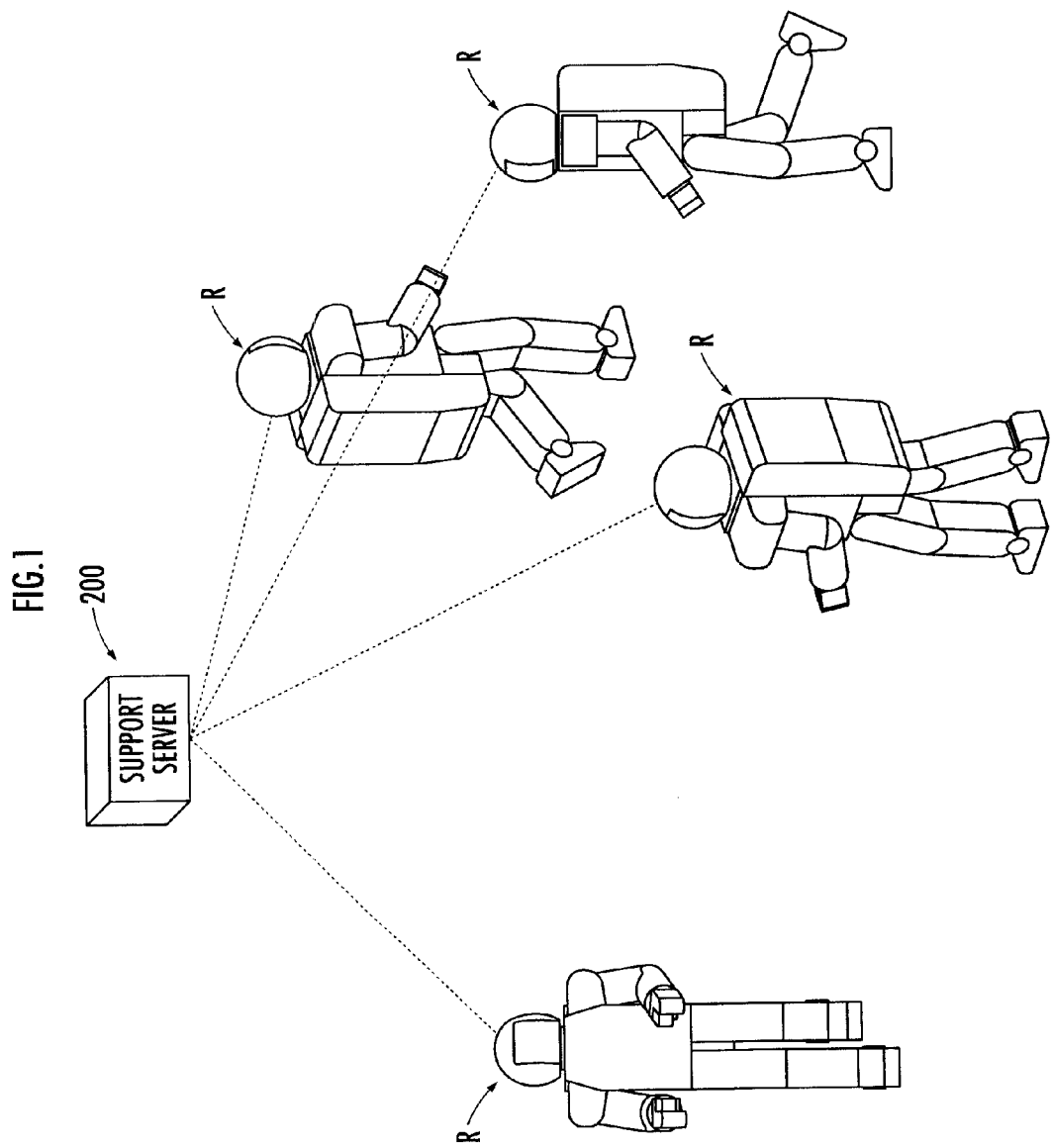
FIG. 1 is a structural diagram illustrating a target route generation system according to an embodiment of the present invention.

As illustrated in FIG. 1, the target route generation system is composed of an autonomous mobile robot R (hereinafter, referred to as robot R) and a support server 200.

Figure 2:
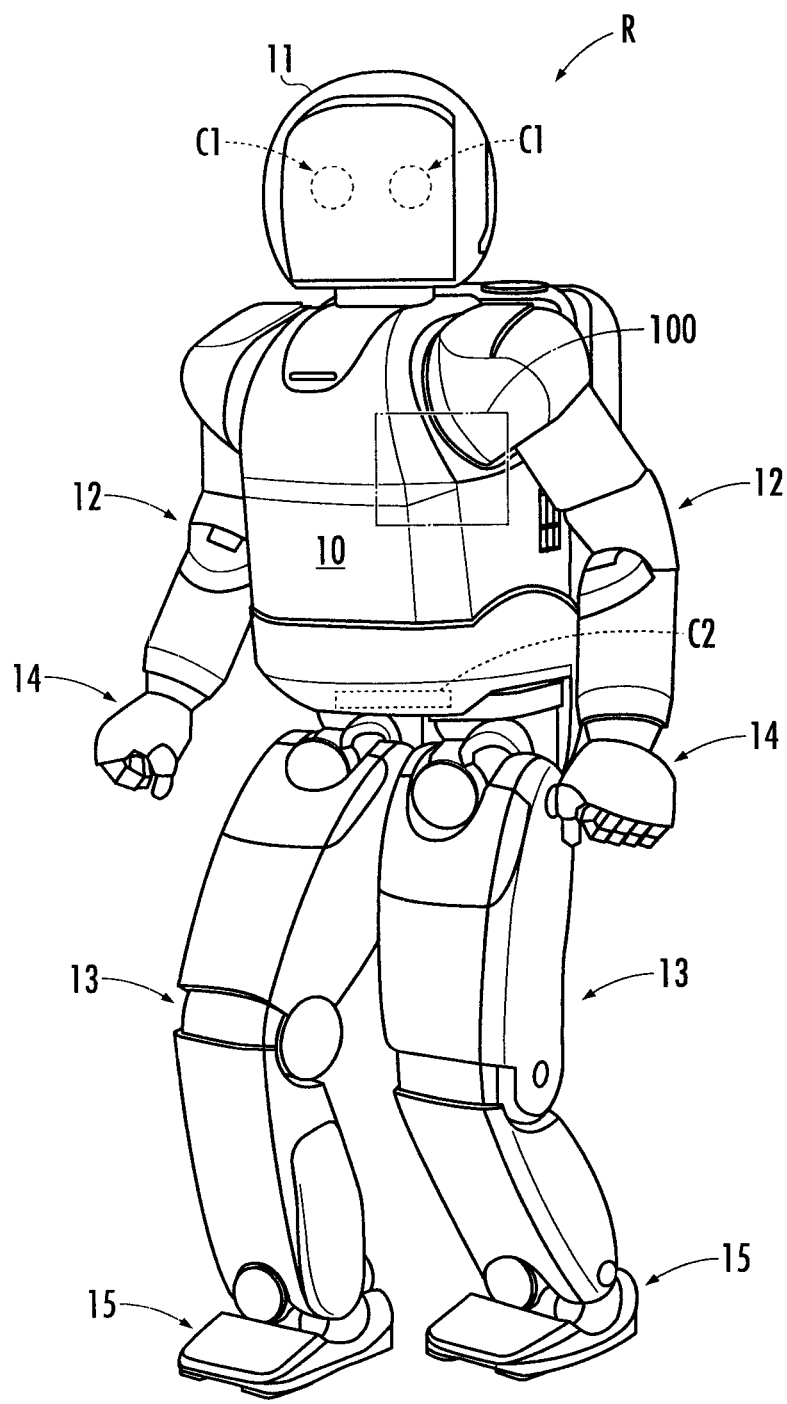
FIG. 2 is a structural diagram of a robot.

As illustrated in FIG. 2, the robot R is provided with a main body 10, a head 11 disposed at the top of the main body 10, a pair of left and right arms 12 extended from both lateral sides of an upper portion of the main body 10, a hand 14 attached to the end portion of each arm 12, a pair of left and right legs 13 extended from the beneath of the main body 10, and a foot 15 attached to the end portion of each leg 13. As disclosed in Japan Domestic re-publication of PCT international applications 2003-090978 and 2003-090979, according to a force transmitted from an actuator 1000 (refer to FIG. 3), the robot R can bend and/or stretch the arms 12 or the legs 13 at a plurality of joints corresponding to a plurality of joints of a human being, such as the shoulder joint, the elbow joint, the wrist joint, the hip joint, the knee joint and the ankle joint. The robot R can move autonomously according to iterated motions of each of the left and right legs 13 (or foot 15) by leaving and landing on the floor repeatedly. The height of the head 11 may be altered from adjusting the oblique angle of the main body 10 with respect to the vertical direction thereof. In addition to the robot R provided with a pair of left and right legs 13 of the present embodiment, the autonomous mobile apparatus may be any locomotive mechanism such as a wheel-type mobile robot (an automobile).

The head 11 is mounted with a pair of head cameras (CCD camera) $C_1$. The pair of head cameras $C_1$ are disposed laterally, facing ahead of the robot R. The main body 10 is mounted with a waist camera $C_2$. The waist camera $A_2$ outputs infrared laser beams (electromagnetic wave) to a detection region A ($C_2$) located downward in front of the robot R, and outputs a signal according to the reflected infrared laser beams. The waist camera $C_2$ is used to determine a position of an object located downward in front of the robot R, a direction or posture of the main body 10 of the robot R on the basis of a recognized shape and posture of a floor mark, and a position or posture of a transportation subject, such as a cart, on the basis of a recognition result on the shape or posture of a mark attached to the transportation subject.

Figure 3:
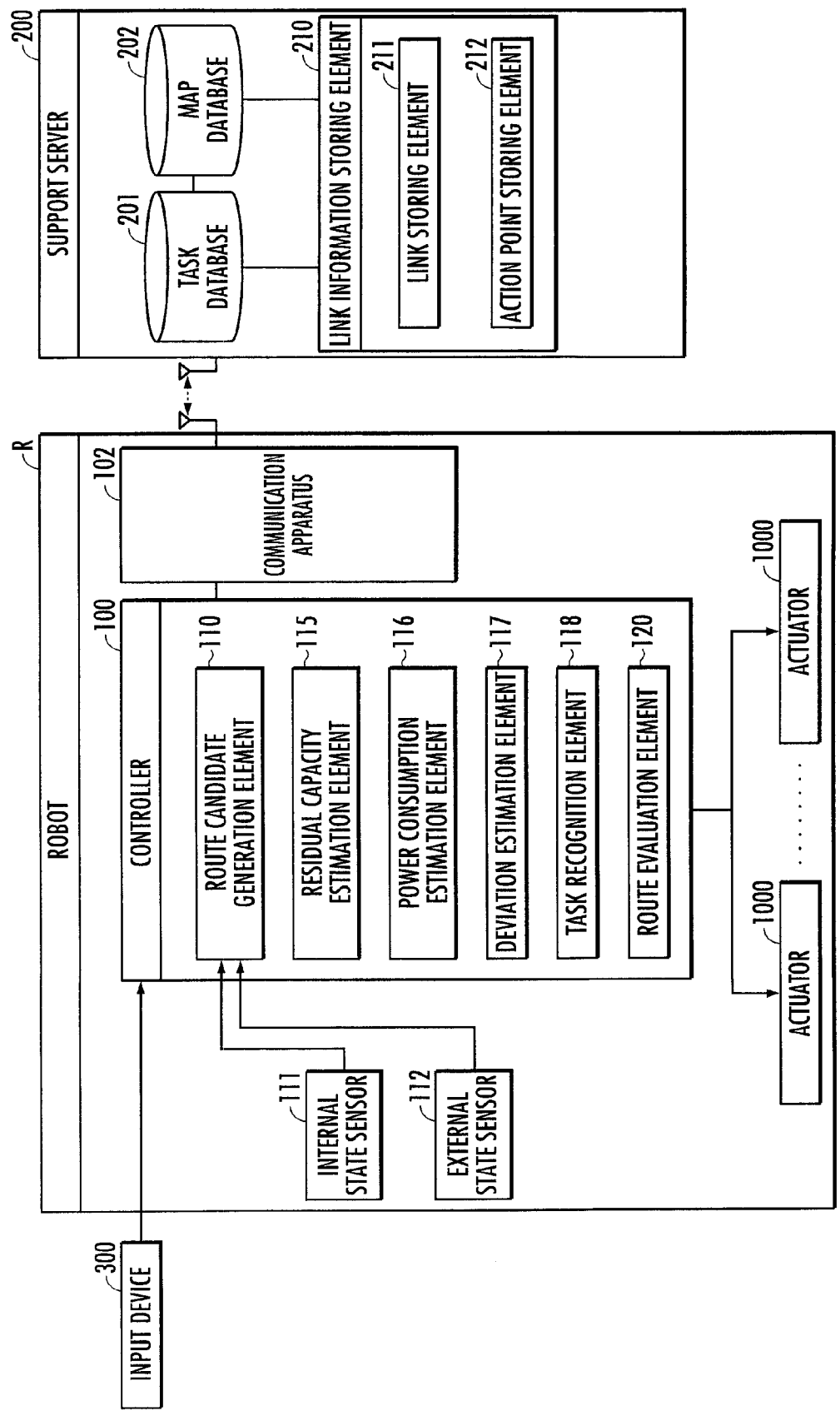
FIG. 3 is a structural diagram illustrating a controller in the robot and a support server.

As illustrated in FIG. 3, the robot R is provided with a controller 100 and a communication device 102. The controller 100 is composed of an ECU or a computer (including a CPU, a ROM, a RAM, an I/O and the like) as the hardware. In a memory of the computer, a control program (software) is stored. The control program may be installed in the computer through the intermediary of a software-recording medium such as a CD or DVD, or may be downloaded to the computer from a server through the intermediary of a network or a satellite according to a request signal sent to the server from the robot R.

As illustrated in FIG. 3, the controller 100 controls the motions of the arms 12 or the legs 13 through controlling the operations of actuators 1000 according to output signals from an internal state sensor 111 and an external state sensor 112. The controller 100 controls the motions of the robot R to execute a task according to a task execution command issued from the support server 200 to the robot R.

The internal sensor 111 is configured to determine an internal state or a behavior of the robot R. Various sensors mounted in the robot R, such as a voltage sensor which detects a terminal voltage of a battery mounted in the robot R, a gyro sensor which outputs signals according to the acceleration of the main body 10, a rotary encoder which outputs signals according to joint angles of each joint, a force sensor which outputs signals according to a floor reaction force applied to the legs 13, correspond to the internal state sensor 111. On the basis of detection data from the sensors, the controller 100 recognizes the internal state or the behavior of the robot R. For example, the controller 100 estimates the open-circuit voltage of the battery on the basis of detection data from the voltage sensor connected to the battery and recognizes a residual capacity of the battery (SOC) according to the estimated result. Moreover, the controller 100 estimates and recognizes the updated self-position of the robot R according to detection data from the gyro sensor and the like.

The external sensor 112 is configured to determine a behavior or the like of an object, and an external state or environment of the robot R. The head cameras $C_1$, the waist camera $C_2$ and the like correspond to the external state sensor 112. In addition to a driving source such as an electric motor, the actuator 1000 is composed of a reduction gear disposed between an output shaft of the driving source and a link constituting the arm 12 or the leg 13, or a flexible element such as an elastic member.

The controller 100 is configured as capable of intercommunicating with an input device (user terminal) 300. The input device 300 is a personal computer terminal provided with an input unit such as a keyboard or a touch panel, and a monitor such as a liquid crystal display. The input device 300 is performed by a user to designate a destination position of the robot R, or a departure position of the robot R (if the departure position is not the present position) in a travel region of the robot R. The input device 300 can be used as a user interface for remote controlling the robot R such as initiation, stop of the robot R, restoring the robot R to the original point or the like according to commands issued from the user; it can also be used in monitoring the motion state of the robot such as displaying images from the head camera $C_1$ and the like.

The controller 100 has functions of recognizing operations performed by a user through the input device 300 and is provided with a route candidate generation element 110, a residual capacity estimation element 115, a power consumption estimation element 116, a deviation estimation element 117, a task recognition element 118, and a route evaluation element 120. The residual capacity estimation element 115, the power consumption estimation element 116, the deviation estimation element 117 and the task recognition element 118 function as state recognition elements for recognizing the state of the robot R.

The controller 100 recognizes the destination position designated by the user through the input device as a terminating point, and the present position of the robot R (or a departure position if specified by the user) as a starting point.

The route candidate generation element 110 generates a plurality of travel route candidates joining the starting point and the terminating point recognized by the controller 100 according to link information transmitted from a link information storing element 210 (to be described hereinafter) disposed in the support server 200.

The residual capacity estimation element 115, on the basis of the residual capacity of battery recognized according to the detection data from the voltage sensor connected to the battery, calculates the residual capacity of battery at each time when the robot. R travels along the travel route candidate generated by the route candidate generation element. The residual capacity of battery can be calculated from consumed power in relation to the travel speed or the like of the robot R according to publicly known estimation approaches.

The consumption power estimation element 116, on the basis of a task which is being executed or is scheduled to be executed by the robot R, calculates estimated consumption power needed to execute the task with reference to task information in a task database 201 (to be described hereinafter) disposed in the support server 200 where appropriate.

The deviation estimation element 117 calculates an estimated deviation of the position or posture in relation to the travel distance away from the destination position or target posture of the robot R. The deviation estimation element 117 calculates the estimated deviation (estimated position deviation and posture deviation) in relation to the travel distance of the robot R with reference to a table or a map designating a relationship between the travel distance and the estimated position deviation and a relationship between the travel distance and the estimated posture deviation.

The task recognition element 118 recognizes task information denoting at least an execution point where a task is being executed or is scheduled to be executed by the robot R as the state of the robot R.

The route evaluation element 120 evaluates each travel route candidate generated by the route candidate generation element 110 whether an action point which should be passed has been passed by or not in view of the state of the robot R (the state of the robot R recognized according to the output values from sensors configured to determine the internal state and external state of the robot R and the task being executed or scheduled to be executed by the robot R).

The support server 200 (composed of a CPU, a ROM, a RAM, an I/O and the like) illustrated in FIG. 3 is capable of communicating with the robot R through a base state (not shown) and a communication network.

The support server 200 is provided with the task database 201, a map database 202 and the link information storing element 210. The task database 201 is stored with the task information denoting contents of each task in a plurality of tasks and items related thereto (for example, a task execution point denoting a location where a task is executed). The map database 202 is stored with map data including displacements of nodes, fixed objects and the like preliminarily set in a travel region of the robot R, or regions inappropriate for the robot R to travel such as a location where a potential transformer is disposed or the periphery of a heat-emitting object, and positions of a plurality of nodes preliminarily set as pass-by points (could be the departure position or the destination position) in the travel region of the robot R. The position of a node may be set arbitrarily by the user through the input device 300.

The link information storing element 210 is configured to store the link information to be transmitted to the robot R and is provided with a link storing element 211 and an action point storing element 212. The link storing element 211 is stored with travelable links obtained by joining two nodes among the plurality of nodes whose positions are stored in the map database 202 when two conditions described below are satisfied. The detail of the two conditions used to set the travelable links is omitted since it has been disclosed in Japanese Patent Laid-Open No. 2006-195969(refer to paragraphs of 0021 to 0024 and FIG. 4). The first condition is that a link is set from a node toward only the other node within a distance threshold (5 m). The second condition is that an edge passing by an obstacle or a region inappropriate for the robot R to travel through is excluded.

The link information storing element 210 recognizes a travelable link as a collection (coordinate series) of a plurality of coordinates, and stores the recognized coordinate series attached with an identifier (link name).

The action point storing element 212 is stored with action points for the robot R in association with the links stored in the link storing element 211. In the action point storing element 212, the coordinates of an action point are stored, and the action point and a link including the action point are associated by relating the coordinates of the action point with the link including a coordinate series in which the coordinates of the action point are included. The action point refers to a location where the robot R has a contact with the external environment directly or indirectly. At least the battery charging point where a charging system for the robot R is located, the position or posture correction point for the robot R such as a mark or the like attached to the floor surface, or the task execution point for the robot R is included in the action point. In addition, the task execution point may be a location where the robot. R changes its posture for holding a cart or a tray, or the terminating point of a task when the task is being executed.

Hereinafter, the processing in the target route generation system with the aforementioned configuration will be described with reference to the drawings of 4 to 13.

[First Embodiment]

Figure 4:
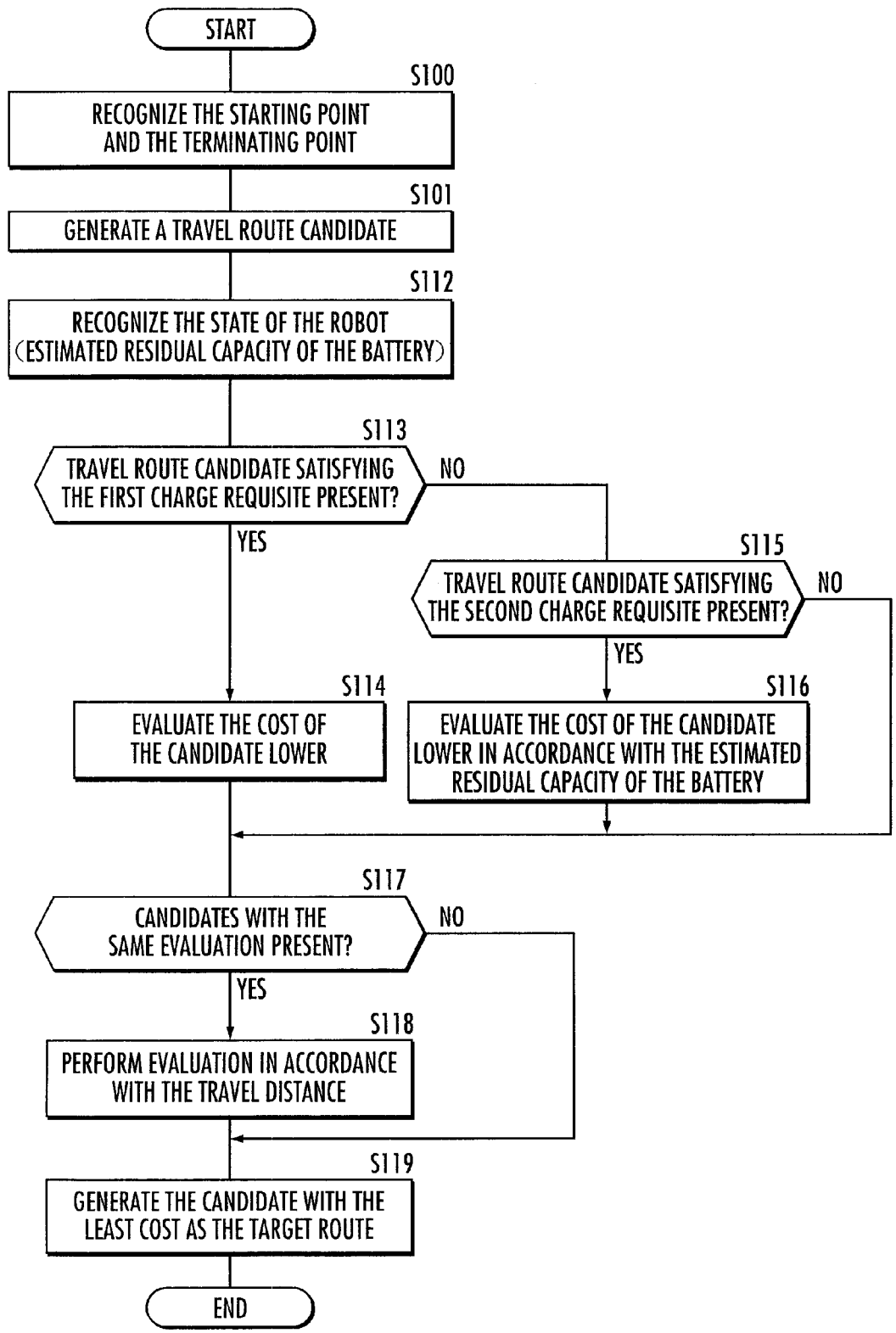
FIG. 4 is a flow chart illustrating a process in a first embodiment of the present invention.

The description will be firstly carried out with reference to the flow chart illustrated in FIG. 4. In the present embodiment, at least the battery charging point EP for the robot R is stored in the action point storing element 212 as the action point; the residual capacity estimation element 115, which is served as the state recognition element, recognizes the estimated residual capacity of battery in relation to the travel distance along a travel route candidate as the state of the robot R.

At the moment when a user sets a destination position (denoted by longitude and latitude) for the robot R on a map (in the travel region of the robot R) displayed on the input device 300, the controller 100 of the robot R recognizes the input destination position as the terminating point TP (FIG. 4/STEP 100). Moreover, the controller 100 recognizes a departure position, namely, the present position (denoted by longitude and latitude) of the robot R as the starting point PP (FIG. 4/STEP 100). The present position is estimated according to GPS signals received by a GPS receiver (not shown) served as the internal state sensor 111 from a satellite, or output signals from a gyro sensor or an acceleration sensor served as the internal state sensor 111. Additionally, when the departure position of the robot R is input personally by the user, the departure position is used as the starting point PP as a substitute for the present position.

Subsequent to the processing at STEP 100, the route candidate generation element 110 of the controller 100, with reference to the travelable links stored in the link storing element 211 of the support server 200 where appropriate, generates a plurality of travel route candidates joining the starling point PP and the terminating point TP by connecting the travelable links (FIG. 4/STEP 101).

Figure 5:
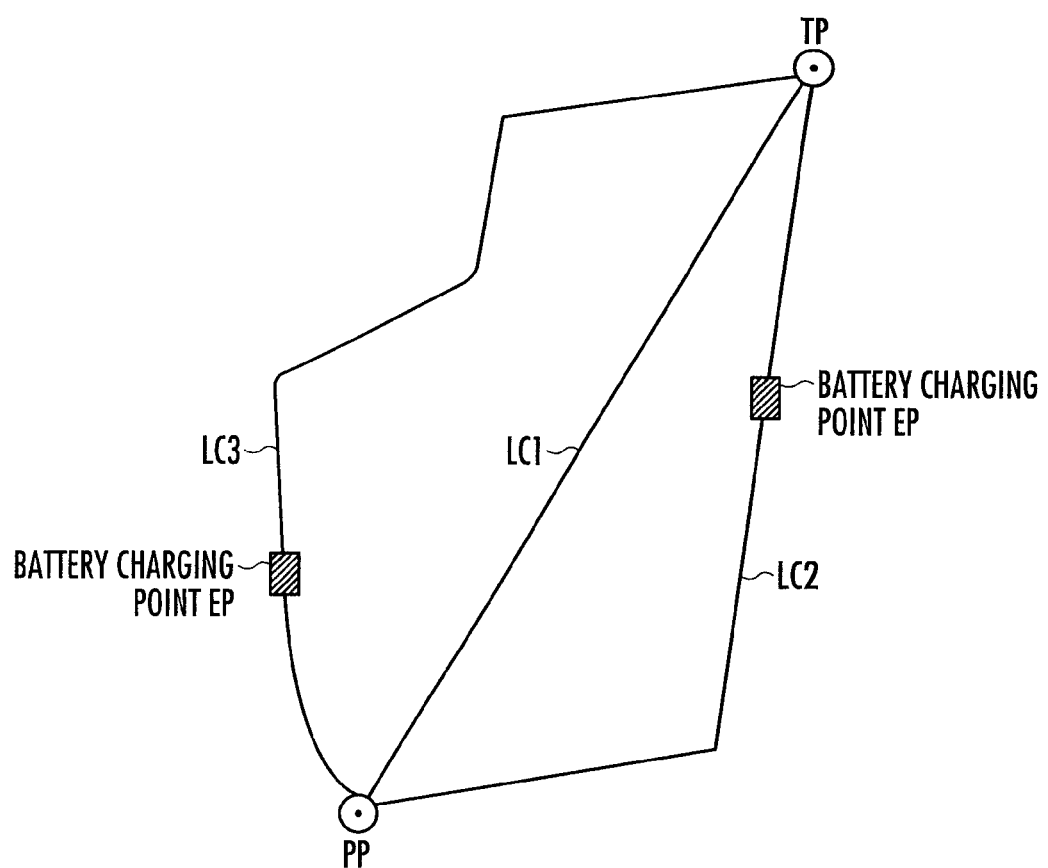
FIG. 5 is an explanatory diagram illustrating a processing content in the first embodiment of the present invention.

For example, as illustrated in FIG. 5, three travel route candidates C1 to C3 joining the starting point PP and the terminating point TP are generated.

Subsequent to the processing at STEP 101, the residual capacity estimation element 115 of the controller 100 calculates the estimated residual capacity of battery in relation to the travel distance of the robot R, and recognizes the estimated residual capacity of battery as the state of the robot (FIG. 4/STEP 112).

Subsequent to the processing at STEP 112, the route evaluation element 120 of the controller 100 evaluates the cost of the plurality of travel route candidates generated at STEP 101 according to the necessity for passing by the action point in a way described hereinafter. Note that the initial costs of the travel route candidates are set identical regardless of the length of the travel route.

First, the route evaluation element 120, on the basis of the estimated residual capacity of battery in relation to the travel distance recognized at STEP 112, determines whether a travel route candidate satisfying a first charge requisite is present or not (FIG. 4/STEP 113). The first charge requisite is so defined that the estimated residual capacity of battery used to move the robot R from the starting point PP to the terminating point TP without charging the battery is equal to or greater than a threshold (for example OO % of the residual capacity of battery).

According to the determination result of STEP 113, when a travel route candidate satisfying the first charge requisite is present (FIG. 4/YES at STEP 113), the route evaluation element 120 sets the cost of the travel route candidate lower than the cost of the other travel route candidates which do not satisfy the first charge requisite (FIG. 4/STEP 114).

For example, as illustrated in FIG. 5, when the travel route candidate LC1 which has a shorter length and satisfies the first charge requisite is present, the cost of the travel route candidate LC1 is evaluated lower than the cost of the travel route candidates LC2 and LC3 which do not satisfy the first charge requisite.

On the other hand, according to the determination result of STEP 113, when no travel route candidate satisfying the first charge requisite is present (FIG. 4/NO at STEP 113), the route evaluation element 120 determines whether a travel route candidate satisfying a second charge requisite is present or not (FIG. 4/STEP 115). The second charge requisite is so defined that the estimated residual capacity of battery used to move the robot R to the terminating point TP becomes equal to or greater than a threshold after the battery is charged at a battery charging point included in a travel route candidate.

According to the determination result of STEP 115, when a travel route candidate satisfying the second charge requisite is present (FIG. 4/YES at STEP 115), the route evaluation element 120 evaluates the cost of the travel route candidate lower according to the estimated residual capacity of battery at the battery charging point in the following way (FIG. 4/STEP 116). Namely, the lower the estimated residual capacity of battery at the battery charging point is, the lower the cost of the travel route candidate satisfying the second charge requisite will be evaluated by the route evaluation element 120. The relationship between the estimated residual capacity of battery and the defined cost is determined with reference to a table specifying the relationship therebetween discontinuously or a map specifying the relationship therebetween continuously, for example.

For example, as illustrated in FIG. 5, among the travel route candidates LC1 to LC3 which do not satisfy the first charge requisite, the cost of the travel route candidates L2 and L3 which satisfy the second charge requisite are evaluated in such a way that the lower the estimated residual capacity of battery at the battery charging point EP is, the lower the cost thereof will be evaluated. Therefore, the travel route candidate LC2 which has a longer travel distance from the starting point PP to the battery charging point EP and has a lower estimated residual capacity of battery at the battery charging point EP is evaluated with a lower cost than the travel route candidate LC3.

On the other hand, according to the determination result of STEP 115, when no travel route candidate satisfying the second charge requisite is present (FIG. 4/NO at STEP 115), the initial cost of each travel route candidate will not be altered by the route evaluation element 120.

Subsequently, after the first evaluation has been performed on the travel route candidates (FIG. 4/STEP 114, STEP 116 and NO at STEP 115), the route evaluation element 120 determines whether travel route candidates with identical evaluation are present or not (FIG. 4/STEP 117).

According to the determination result of STEP 117, when there are travel route candidates with identical evaluation present (FIG. 4/YES at STEP 117), the route evaluation element 120 evaluates the travel route candidates according to the length thereof in the following way (FIG. 4/STEP 118). Namely, the shorter the length of a travel route candidate is, the lower the cost thereof will be evaluated by the route evaluation element 120 so that the shortest travel route candidate joining the starting point PP and the terminating point TP has the least cost.

On the other hand, according to the determination result of STEP 117, when no travel route candidate with the identical evaluation is present (FIG. 4/NO at STEP 115), the initial cost of each travel route candidate (obtained from the first evaluation) will not be altered by the route evaluation element 120.

After the secondary evaluation has been performed on the travel route candidates (FIG. 4/STEP 118 and NO at STEP 117), the route evaluation element 120 generates the travel route candidate with the least cost among the travel route candidates as the target route along which the robot R travels autonomously (FIG. 4/STEP 119).

As mentioned above, according to the cost set for each travel route candidate, a travel route candidate where the battery is not needed to be charged can be generated as the target route. When there is no travel route candidate where the battery is not needed to be charged existed, a travel route candidate passing by a battery charging point can be generated as the target route; and the higher the necessity of charging the battery in the battery charging point is, the travel route candidate will be mostly generated as the target route.

[Second Embodiment]

Figure 6:
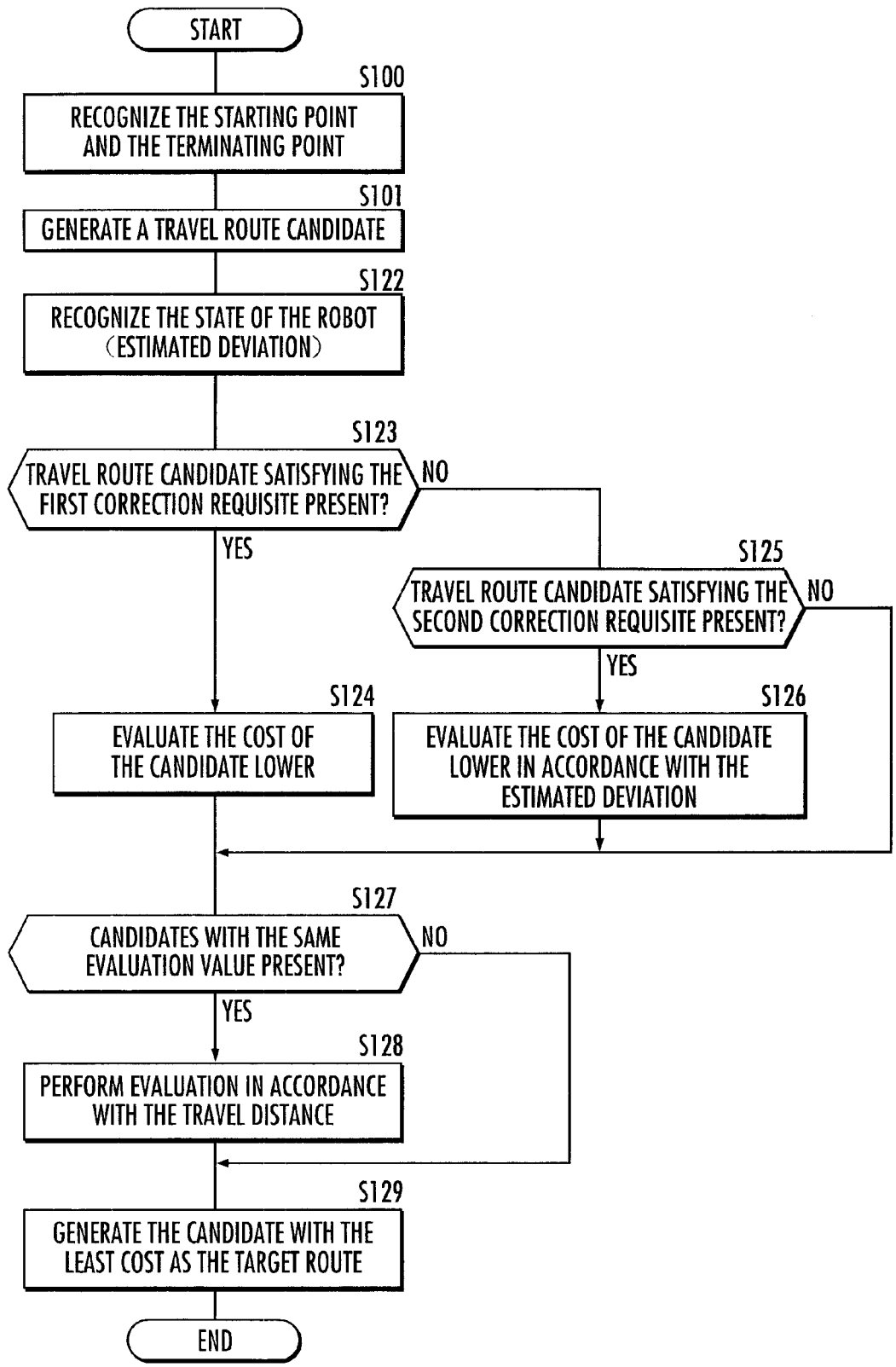
FIG. 6 is a flow chart illustrating a process in a second embodiment of the present invention.

The description will be carried out with reference to the flow chart illustrated in FIG. 6. In the present embodiment, at least the position or posture correction point CP of the robot R is stored in the action point storing element 212 as the action point; the deviation estimation element 117, which is served as the state recognition element, recognizes the estimated deviation of the position or posture from the destination position or target posture of the robot R in accordance with the travel distance as the state of the robot R.

In the present embodiment, the processing performed at STEP 100 and STEP 101 is identical to that in the first embodiment, and the same reference numerals are used therein, the descriptions thereof are omitted.

Subsequent to the processing at STEP 101, the deviation estimation element 117 of the controller 100 calculates the estimated deviation in accordance with the travel distance of the robot R, and recognizes the calculated deviation as the state of the robot R (FIG. 6/STEP 122).

Subsequent to the processing at STEP 122, the route evaluation element 120 of the controller 100 evaluates the cost of the plurality of travel route candidates generated at STEP 101 according to the necessity for passing by the action point in a way described hereinafter. Note that the initial costs of the travel route candidates are set identical regardless of the length of the travel route.

First, the route evaluation element 120, on the basis of the estimated deviation in relation to the travel distance recognized at STEP 122, determines whether a travel route candidate satisfying a first correction requisite is present or not (FIG. 6/STEP 123). The first correction requisite is so defined that the estimated deviation when the robot R is moved from the starting point PP to the terminating point TP with the position or posture thereof uncorrected is equal to or smaller than a threshold.

According to the determination result of STEP 123, when a travel route candidate satisfying the first correction requisite is present (FIG. 6/YES at STEP 123), the route evaluation element 120 sets the cost of the travel route candidate lower than the cost of the other travel route candidates which do not satisfy the first correction requisite (FIG. 6/STEP 124).

Figure 7:
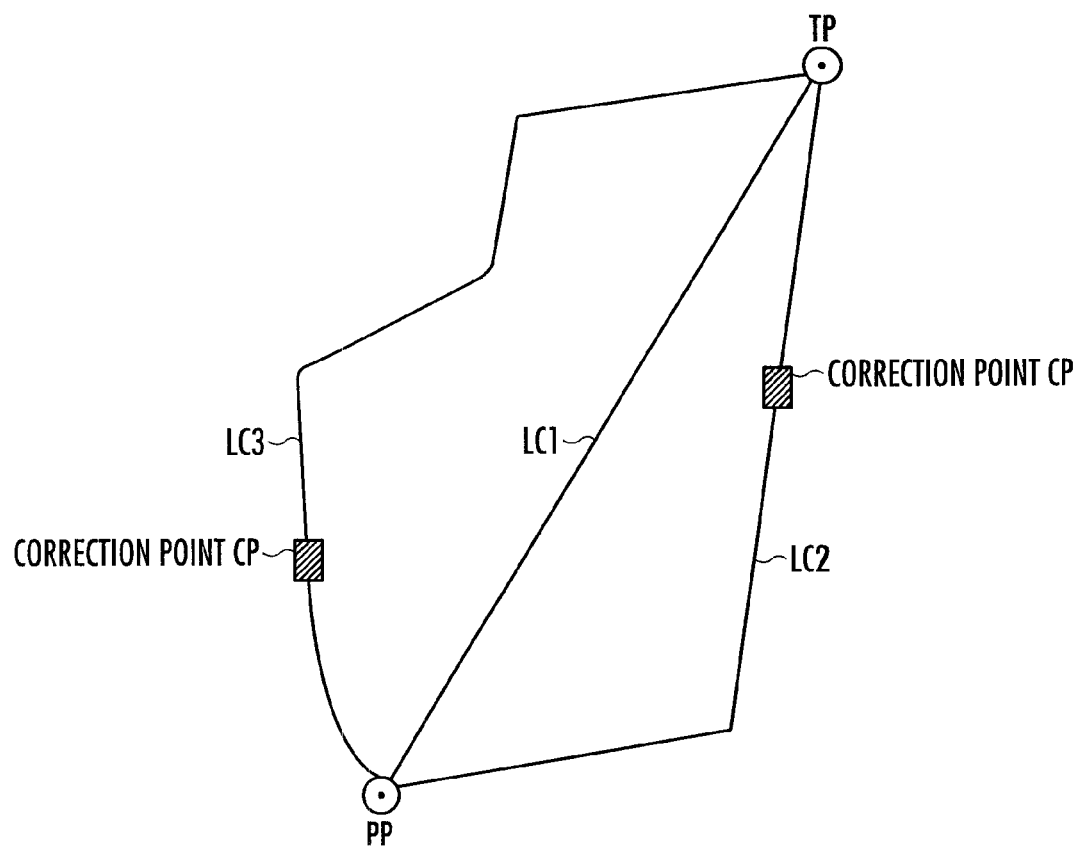
FIG. 7 is an explanatory diagram illustrating a processing content in the second embodiment of the present invention.

For example, as illustrated in FIG. 7, when the travel route candidate LC1 which has a shorter length and satisfies the first correction requisite is present, the cost of the travel route candidate LC1 is evaluated lower than the cost of the travel route candidates LC2 and LC3 which do not satisfy the first correction requisite.

On the other hand, according to the determination result of STEP 123, when no travel route candidate satisfying the first correction requisite is present (FIG. 6/NO at STEP 123), the route evaluation element 120 determines whether a travel route candidate satisfying a second correction requisite is present or not (FIG. 6/STEP 125). The second correction requisite is so defined that the estimated deviation when the robot R is moved to the terminating point TP becomes equal to or smaller than a threshold after the position or posture thereof is corrected at a correction point included in a travel route candidate.

According to the determination result of STEP 125, when a travel route candidate satisfying the second correction requisite is present (FIG. 6/YES at STEP 125), the route evaluation element 120 evaluates the cost of the travel route candidate lower according to the estimated deviation at the correction point in the following way (FIG. 6/STEP 126). Namely, the greater the estimated deviation at the correction point is, the lower the cost of the travel route candidate satisfying the second correction requisite will be evaluated by the route evaluation element 120. The relationship between the estimated deviation and the defined cost is determined with reference to a table specifying the relationship therebetween discontinuously or a map specifying the relationship therebetween continuously, for example.

For example, as illustrated in FIG. 7, among the travel route candidates LC1 to LC3 which do not satisfy the first correction requisite, the cost of the travel route candidates L2 and L3 which satisfy the second correction requisite are evaluated in such a way that the greater the estimated deviation at the correction point is, the lower the cost thereof will be evaluated. Therefore, the travel route candidate LC2 which has a longer travel distance from the starting point PP to the correction point and has a greater estimated deviation at the correction point is evaluated with a lower cost than the travel route candidate LC3.

On the other hand, according to the determination result of STEP 125, when no travel route candidate satisfying the second correction requisite is present (FIG. 6/NO at STEP 125), the initial cost of each travel route candidate will not be altered by the route evaluation element 120.

Subsequently, after the first evaluation has been performed on the travel route candidates (FIG. 6/STEP 124, STEP 126 and NO at STEP 125), the route evaluation element 120 determines whether travel route candidates with identical evaluation are present or not (FIG. 6/STEP 127).

According to the determination result of STEP 127, when there are travel route candidates with identical evaluation present (FIG. 5/YES at STEP 127), the route evaluation element 120 evaluates the travel route candidates according to the length thereof in the following way (FIG. 6/STEP 128). Namely, the shorter the length of a travel route candidate is, the lower the cost thereof will be evaluated by the route evaluation element 120 so that the shortest travel route candidate joining the starting point PP and the terminating point TP has the least cost.

On the other hand, according to the determination result of STEP 127, when there are no travel route candidates with the identical evaluation present (FIG. 6/NO at STEP 127), the initial cost of each travel route candidate (obtained from the first evaluation) will not be altered by the route evaluation element 120.

After the secondary evaluation has been performed on the travel route candidates (FIG. 6/STEP 128 and NO at STEP 127), the route evaluation element 120 generates the travel route candidate with the least cost among the travel route candidates as the target route along which the robot R travels autonomously (FIG. 6/STEP 129).

It is acceptable to add a condition that the estimated deviation is in an allowable deviation range of the robot R in the determination of the first and second correction requisites. Accordingly, a travel route candidate whose estimated deviation might go beyond the allowable deviation range can be prevented from being evaluated.

As mentioned above, according to the cost set for each travel route candidate, a travel route candidate where the correction is not needed to be performed can be generated as the target route. When there is no travel route candidate where the correction is not needed to be performed existed, a travel route candidate passing by a correction point can be generated as the target route; and the higher the necessity of performing the correction at the correction point is, the travel route candidate will be mostly generated as the target route.

[Third Embodiment]

Figure 8:
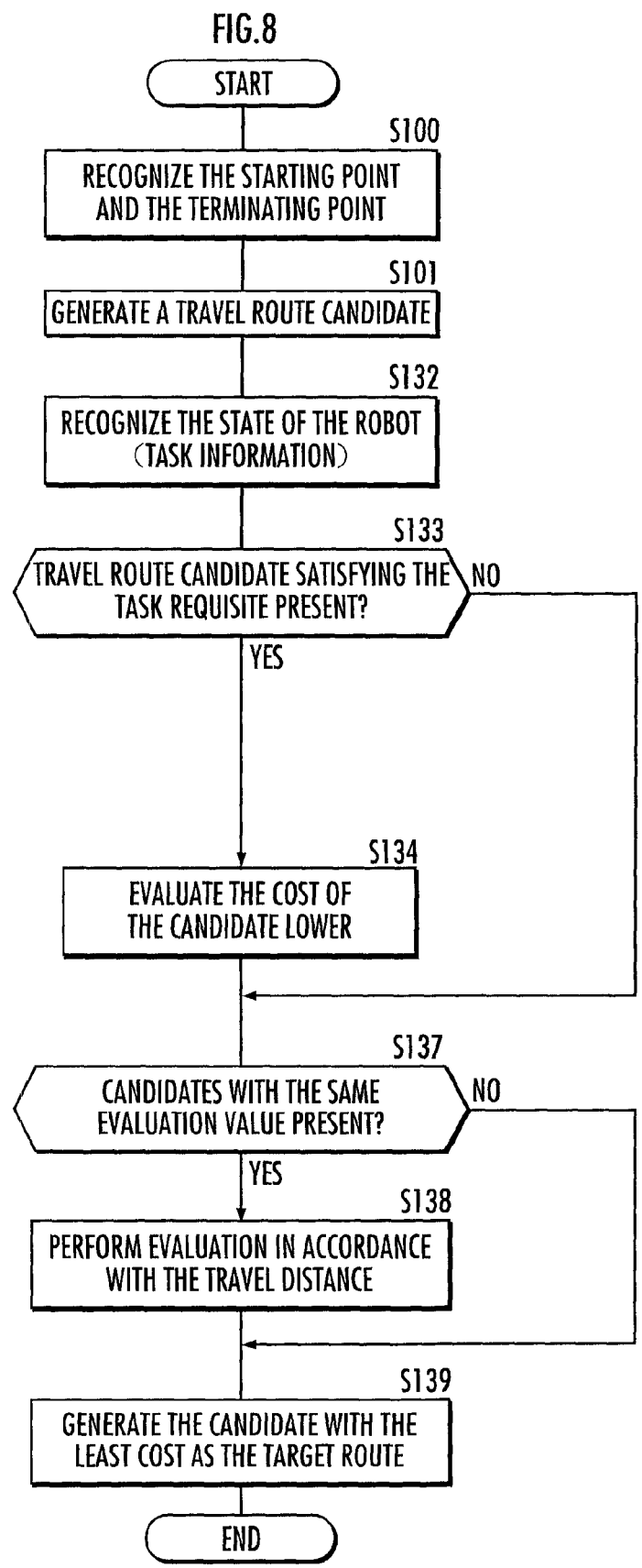
FIG. 8 is a flow chart illustrating a process in a third embodiment of the present invention.

The description will be carried out with reference to the flow chart illustrated in FIG. 8. In the present embodiment, at least a task execution point for the robot R is stored in the action point storing element 212 as the action point; the task recognition element 118, which is served as the state recognition element, recognizes the task information denoting at least a task execution point where a task is being executed or is scheduled to be executed by the robot R as the state of the robot R.

In the present embodiment, the processing performed at STEP 100 and STEP 101 is identical to that in the first embodiment, and the same reference numerals are used therein, the descriptions thereof are omitted.

Subsequent to the processing at STEP 101, the task recognition element 118 of the controller 100 recognizes the task information denoting at least a task execution point where a task is being executed or is scheduled to be executed by the robot R as the state of the robot R (FIG. 8/STEP 132).

Subsequent to the processing at STEP 132, the route evaluation element 120 of the controller 100 evaluates the cost of the plurality of travel route candidates generated at STEP 101 according to the necessity for passing by the action point in a way described hereinafter. Note that the initial costs of the travel route candidates are set identical regardless of the length of the travel route.

First, the route evaluation element 120, on the basis of the task information recognized at STEP 132, determines whether a travel route candidate satisfying a task requisite, namely a task execution point is included in the travel route candidate, is present or not (FIG. 8/STEP 133).

According to the determination result of STEP 133, when a travel route candidate satisfying the task requisite is present (FIG. 8/ YES at STEP 133), the route evaluation element 120 sets the cost of the travel route candidate lower than the cost of the other travel route candidates which do not satisfy the task requisite (FIG. 8/STEP 134).

Figure 9:
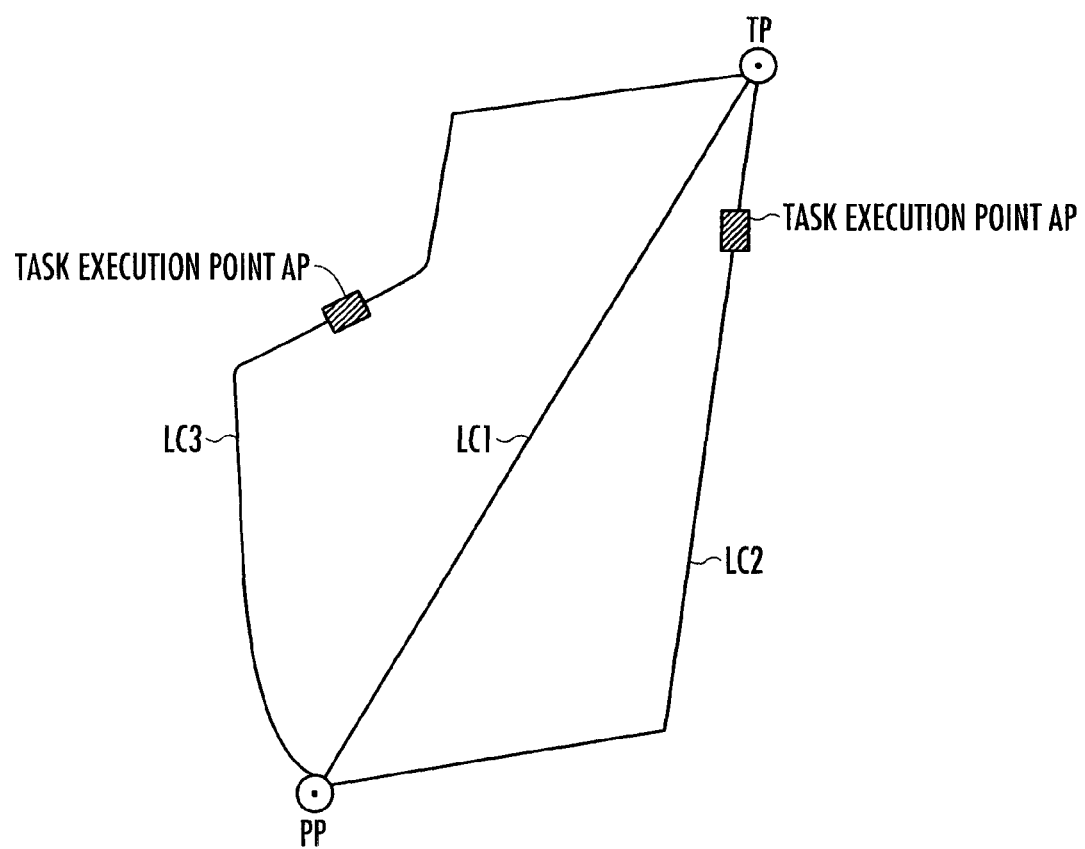
FIG. 9 is an explanatory diagram illustrating a processing content in the third embodiment of the present invention.

For example, as illustrated in FIG. 9, regardless of the length of the travel route candidate, when the travel route candidates LC2 and LC3 which satisfy the task requisite are present, the cost of the travel route candidates LC2 and LC3 are evaluated lower than the cost of the travel route candidates LC1 which does not satisfy the task requisite.

On the other hand, according to the determination result of STEP 133, when no travel route candidate satisfying the task requisite is present (FIG. 8/NO at STEP 133), the initial cost of each travel route candidate will not be altered by the route evaluation element 120.

Subsequently, after the first evaluation has been performed on the travel route candidates (FIG. 8/STEP 134 and NO at STEP 133), the route evaluation element 120 determines whether travel route candidates with identical evaluation are present or not (FIG. 8/STEP 137).

According to the determination result of STEP 137, when there are travel route candidates with identical evaluation present (FIG. 8/YES at STEP 137), the route evaluation element 120 evaluates the travel route candidates according to the length thereof in the following way (FIG. 8/STEP 138). Namely, the shorter the length of a travel route candidate is, the lower the cost thereof will be evaluated by the route evaluation element 120 so that the shortest travel route candidate joining the starting point PP and the terminating point TP has the least cost.

For example, as illustrated in FIG. 9, the travel route candidates LC2 and LC3 satisfying the task requisite are evaluated to have the identical cost. Therefore, the travel route candidate LC2 having a shorter travel distance from the starting point PP to the terminating point TP is evaluated to have a lower cost than the travel route candidate LC3.

On the other hand, according to the determination result of STEP 137, when no travel route candidate with the identical evaluation is present (FIG. 8/NO at STEP 137), the initial cost of each travel route candidate (obtained from the first evaluation) will not be altered by the route evaluation element 120.

After the secondary evaluation has been performed on the travel route candidates (FIG. 8/STEP 138 and NO at STEP 137), the route evaluation element 120 generates the travel route candidate with the least cost among the travel route candidates as the target route along which the robot R travels autonomously (FIG. 8/STEP 139).

As mentioned above, according to the cost set for each travel route candidate, a travel route candidate passing by a task execution point which is necessary according to the task information can be generated as the target route.

[Fourth Embodiment]

Figure 10:
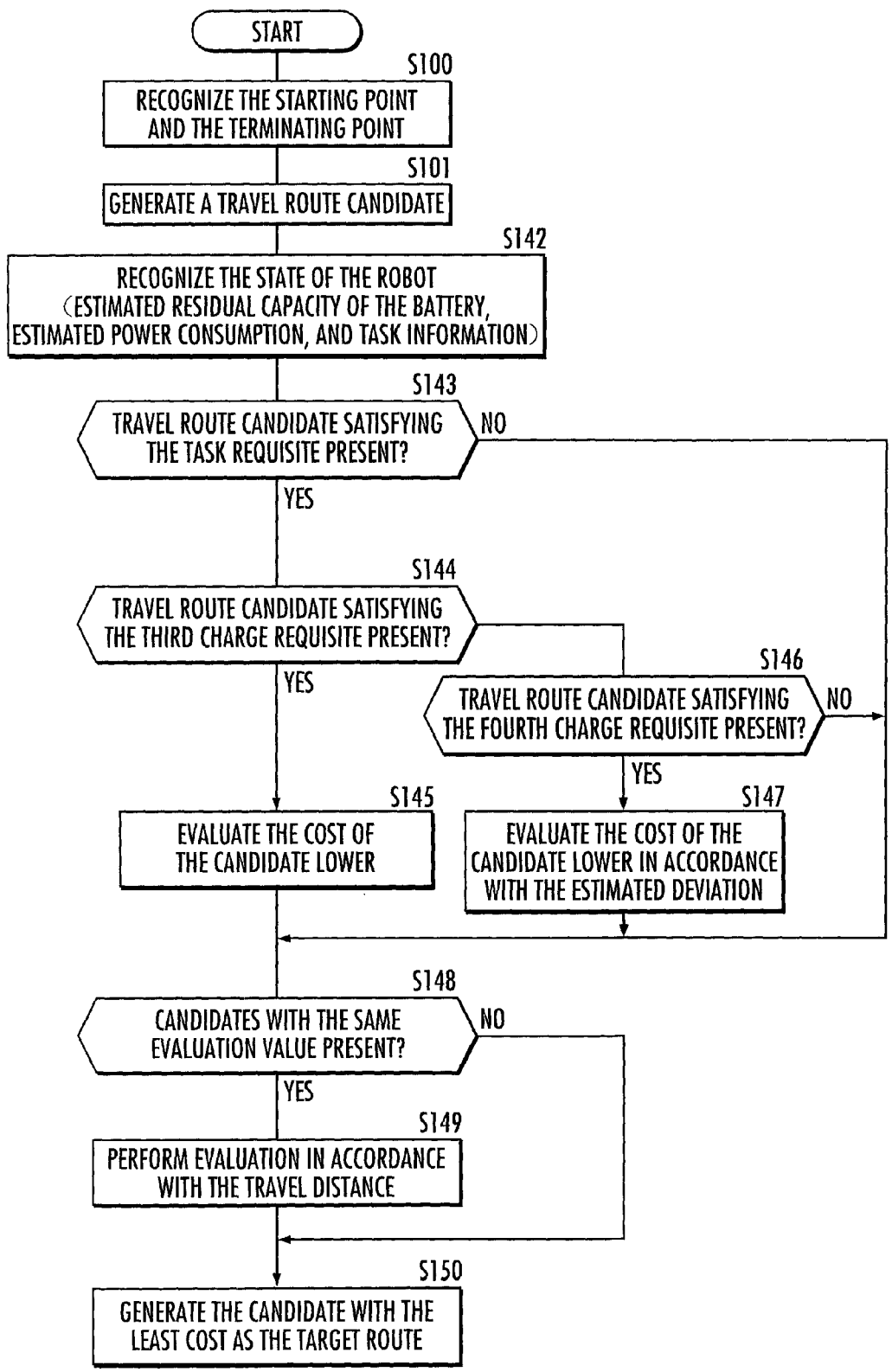
FIG. 10 is a flow chart illustrating a process in a fourth embodiment of the present invention.

The description will be carried out with reference to the flow chart illustrated in FIG. 10. In the present embodiment, at least a battery charging point for the robot and a task execution point for the robot are stored in the action point storing element 212 as the action point; as the state recognition element, the estimated residual capacity estimation element 115 recognizes the residual capacity of battery in relation to the travel distance along a travel route candidate, the power consumption estimation element 116 recognizes estimated consumption power necessary for a task being executed or scheduled to be executed by the robot R, and the task recognition element 118 recognizes the task information denoting at least a task execution point where a task is being executed or is scheduled to be executed by the robot R as the state of the robot R.

In the present embodiment, the processing performed at STEP 100 and STEP 101 is identical to that in the first embodiment, and the same reference numerals are used therein, the descriptions thereof are omitted.

Subsequent to the processing at STEP 101, the residual capacity estimation element 115 of the controller 100 calculates the estimated residual capacity of battery in relation to the travel distance of the robot R, and recognizes the estimated residual capacity of battery as the state of the robot (FIG. 10/ STEP 142). The power consumption estimation element 116 recognizes the estimated consumption power necessary for a task being executed or scheduled to be executed by the robot R as the state of the robot (FIG. 10/ STEP 142). Furthermore, the task recognition element 118 of the controller 100 recognizes the task information denoting at least a task execution point where a task is being executed or is scheduled to be executed by the robot R as the state of the robot R (FIG. 10/STEP 142).

Subsequent to the processing at STEP 142, the route evaluation element 120 of the controller 100 evaluates the cost of the plurality of travel route candidates generated at STEP 101 according to the necessity for passing by the action point in a way described hereinafter. Note that the initial costs of the travel route candidates are set identical regardless of the length of the travel route.

First, the route evaluation element 120, on the basis of the task information recognized at STEP 142, determines whether a travel route candidate satisfying the task requisite, namely including therein a task execution point, is present or not (FIG. 10/STEP 143).

According to the determination result of STEP 143, when travel route candidates satisfying the task requisite are present (FIG. 10/YES at STEP 143), the route evaluation element 120, en the basis of the estimated residual capacity of battery in relation to the travel distance recognized at STEP 142, determines whether a travel route candidate satisfying a third charge requisite is present or not (FIG. 10/STEP 144). The third charge requisite is so defined that the estimated residual capacity of battery used to move the robot R to the task execution point is equal to or greater than a threshold which is defined according to the contents of the task.

The threshold for the estimated residual capacity of battery defined according to the contents of the task is a value preliminarily set according to the estimated consumption power (recognized at STEP 142) needed to execute a task. In specific, the threshold for the estimated residual capacity of battery is set by adding a given amount of power which can make the robot R travel a defined travel distance to the estimated consumption power.

According to the determination result of STEP 144, when a travel route candidate satisfying the third charge requisite is present (FIG. 10/YES at STEP 144), the route evaluation element 120 sets the cost of the travel route candidate lower than the cost of the other travel route candidates which do not satisfy the third charge requisite (FIG. 10/STEP 145).

Figure 11:
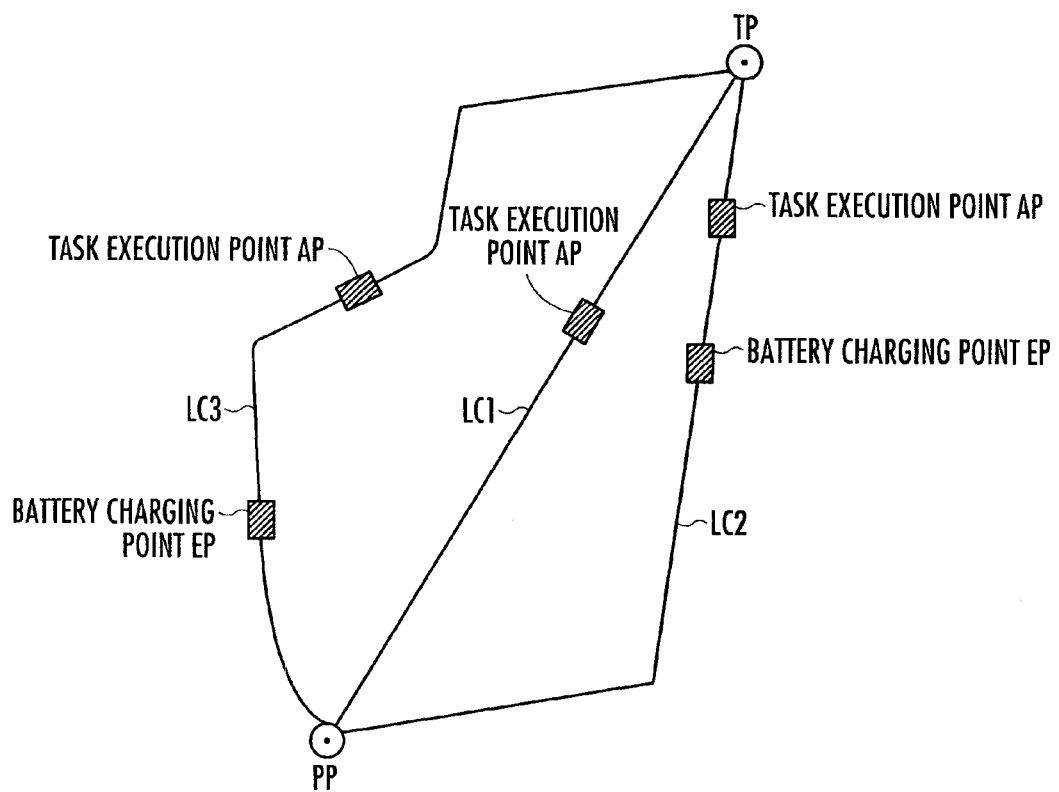
FIG. 11 is an explanatory diagram illustrating a processing content in the fourth embodiment of the present invention.

For example, as illustrated in FIG. 11, when the travel route candidate LC1 which has a shorter length and satisfies the third charge requisite is present in the three travel route candidates LC1 to LC3 satisfying the task requisite, the cost of the travel route candidate LC1 is evaluated lower than the cost of the travel route candidates LC2 and LC3 which do not satisfy the third charge requisite.

On the other hand, according to the determination result of STEP 144, when no travel route candidate satisfying the third charge requisite is present (FIG. 10/NO at STEP 144), the route evaluation element 120 determines whether a travel route candidate satisfying a fourth charge requisite is present or not (FIG. 10/STEP 146). The fourth charge requisite is so defined that the estimated residual capacity of battery used to move the robot R to the task execution point after being charged at a battery charging point included in a travel route candidate is equal to or greater than a threshold which is defined according to the contents of the task.

According to the determination result of STEP 146, when a travel route candidate satisfying the fourth charge requisite is present (FIG. 10/YES at STEP 146), the route evaluation element 120 evaluates the cost of the travel route candidate lower according to the estimated residual capacity of battery at the battery charging point in the following way (FIG. 10/STEP 147). Namely, the lower the estimated residual capacity of battery at the battery charging point is, the lower the cost of the travel route candidate satisfying the fourth charge requisite will be evaluated by the route evaluation element 120. The relationship between the estimated residual capacity of battery and the defined cost is determined with reference to a table specifying the relationship therebetween discontinuously or a map specifying the relationship therebetween continuously, for example.

For example, as illustrated in FIG. 11, among the travel route candidates LC1 to LC3 which do not satisfy the third charge requisite, the cost of the travel route candidates LC2 and LC3 which satisfy the fourth charge requisite are evaluated in such a way that the lower the estimated residual capacity of battery at the battery charging point EP is, the lower the cost thereof will be evaluated. Therefore, the travel route candidate LC2 which has a longer travel distance from the starting point PP to the battery charging point EP and has a lower estimated residual capacity of battery at the battery charging point EP is evaluated with a lower cost than the travel route candidate LC3.

On the other hand, when no travel route candidate satisfying the task requisite is present (FIG. 10/NO at STEP 143) according to the determination result of STEP 143, or when no travel route candidate satisfying the fourth charge requisite is present (FIG. 10/NO at STEP 146) according to the determination result of STEP 146, the initial cost of each travel route candidate will not be altered by the route evaluation element 120.

Subsequently, after the first evaluation has been performed on the travel route candidates (FIG. 10/STEP 145, STEP 147 and NO at STEP 143), the route evaluation element 120 determines whether travel route candidates with identical evaluation are present or not (FIG. 10/STEP 148).

According to the determination result of STEP 148, when there are travel route candidates with identical evaluation present (FIG. 10/YES at STEP 148), the route evaluation element 120 evaluates the travel route candidates according to the length thereof in the following way (FIG. 10/STEP 149). Namely, the shorter the length of a travel route candidate is, the lower the cost thereof will be evaluated by the route evaluation element 120 so that the shortest travel route candidate joining the starting point PP and the terminating point TP has the least cost.

On the other hand, according to the determination result of STEP 148, when there are no travel route candidates with the identical evaluation present (FIG. 10/NO at STEP 148), the initial cost of each travel route candidate (obtained from the first evaluation) will not be altered by the route evaluation element 120.

After the secondary evaluation has been performed on the travel route candidates (FIG. 10/STEP 149 and NO at STEP 148), the route evaluation element 120 generates the travel route candidate with the least cost among the travel route candidates as the target route along which the robot R travels autonomously (FIG. 10/STEP 150).

As mentioned above, according to the cost set for each travel route candidate, a travel route candidate where the battery is not needed to be charged can be generated as the target route under consideration of executing the task. When there is no travel route candidate where the battery is not needed to be charged existed, a travel route candidate passing by a battery charging point can be generated as the target route; and the higher the necessity of charging the battery in the battery charging point is, the travel route candidate will be mostly generated as the target route.

[Fifth Embodiment]

Figure 12:
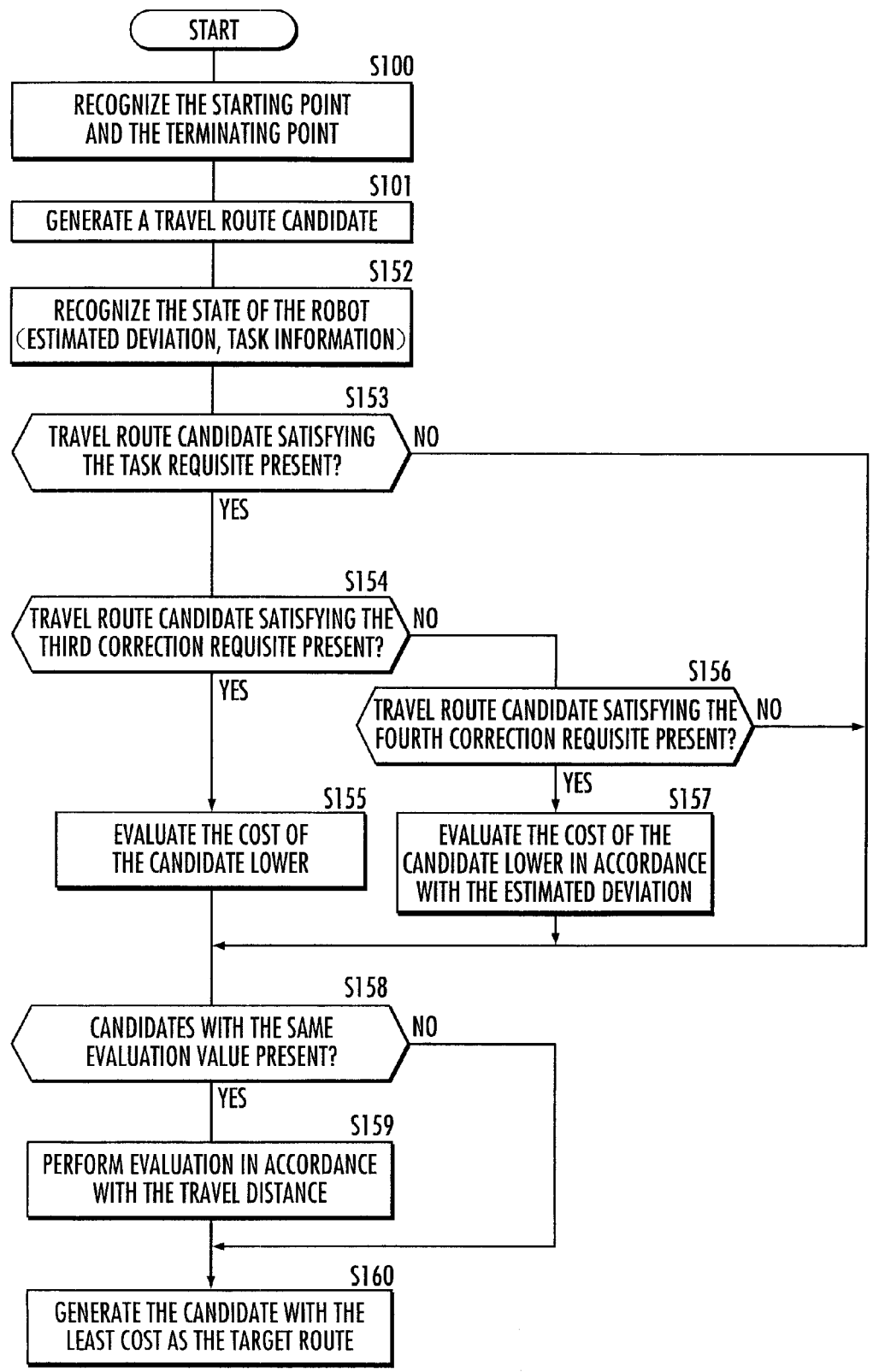
FIG. 12 is a flow chart illustrating a process in a fifth embodiment of the present invention.

The description will be carried out with reference to the flow chart illustrated in FIG. 12. In the present embodiment, at least a position or posture correction point of the robot and a task execution point for the robot are stored in the action point storing element 212 as the action point; as the state recognition element, the deviation estimation element 117 recognizes the estimated deviation of a position or posture of the robot R from the destination position or target posture thereof in accordance with the travel distance as the state of the robot R; and the task recognition element 118 recognizes the task information denoting at least a task execution point where a task is being executed or is scheduled to be executed by the robot R as the state of the robot R.

In the present embodiment, the processing performed at STEP 100 and STEP 101 is identical to that in the first embodiment, and the same reference numerals are used therein, the descriptions thereof are omitted.

Subsequent to the processing at STEP 101, the deviation estimation element 117 of the controller 100 calculates the estimated deviation in accordance with the travel distance of the robot R, and recognizes the calculated deviation as the state of the robot R (FIG. 12/STEP 152). Furthermore, the deviation estimation element 117 of the controller 100 recognizes the task information denoting at least a task execution point where a task is being executed or is scheduled to be executed by the robot R as the state of the robot R (FIG. 12/STEP 152).

Subsequent to the processing at STEP 152, the route evaluation element 120 of the controller 100 evaluates the cost of the plurality of travel route candidates generated at STEP 101 according to the necessity for passing by the action point in a way described hereinafter. Note that the initial costs of the travel route candidates are set identical regardless of the length of the travel route.

First, the route evaluation element 120, on the basis of the task information recognized at STEP 152, determines whether a travel route candidate satisfying the task requisite, namely including therein a task execution point, is present or not (FIG. 12/STEP 153).

According to the determination result of STEP 153, when travel route candidates satisfying the task requisite are present (FIG. 12/YES at STEP 153), the route evaluation element 120, on the basis of the estimated deviation in relation to the travel distance recognized at STEP 152, determines whether a travel route candidate satisfying a third correction requisite is present or not (FIG. 10/STEP 154). The third correction requisite is so defined that the estimated deviation when the robot R is moved to the task execution point is equal to or smaller than a threshold which is defined according to the contents of the task. The threshold for the estimated deviation defined according to the contents of the task is a value preliminarily set according to an error accuracy predefined in accordance with the executed task.

According to the determination result of STEP 154, when a travel route candidate satisfying the third correction requisite is present (FIG. 12/YES at STEP 154), the route evaluation element 120 sets the cost of the travel route candidate lower than the cost of the other travel route candidates which do not satisfy the third correction requisite (FIG. 12/STEP 155).

Figure 13:
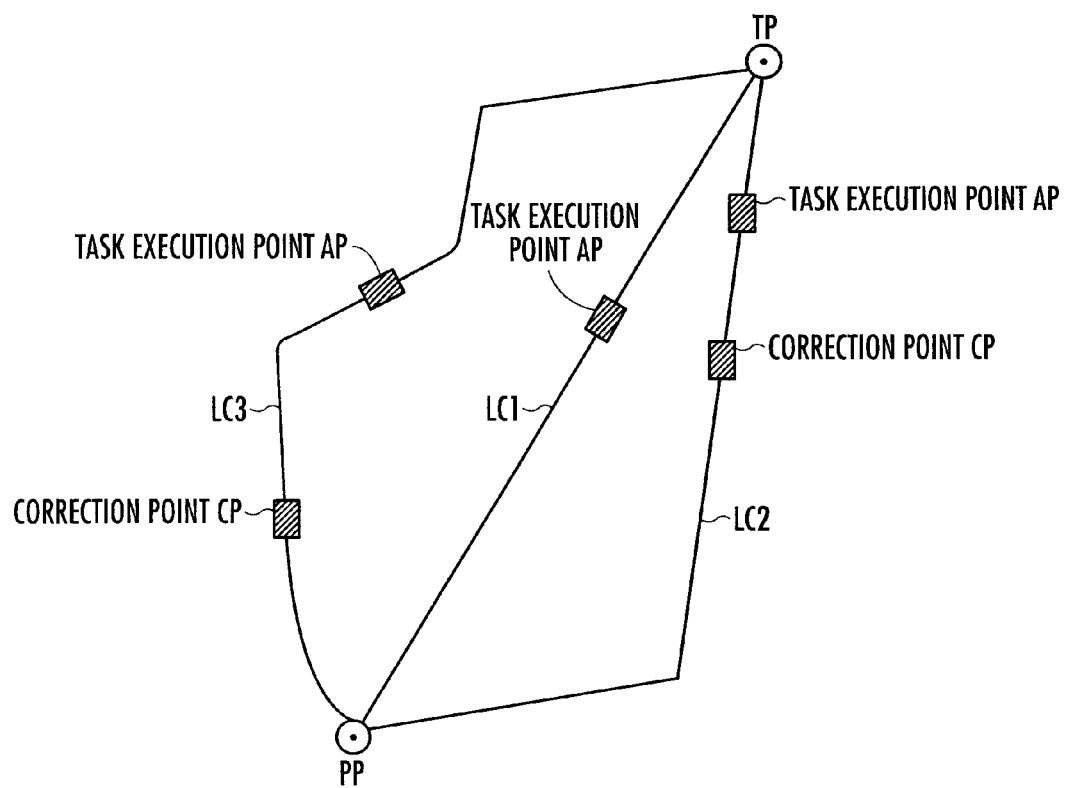
FIG. 13 is an explanatory diagram illustrating a processing content in the fifth embodiment of the present invention.

For example, as illustrated in FIG. 13, when the travel route candidate LC1 which has a shorter length and satisfies the third correction requisite is present in the three travel route candidates LC1 to LC3 satisfying the task requisite, the cost of the travel route candidate LC1 is evaluated lower than the cost of the travel route candidates LC2 and LC3 which do not satisfy the third correction requisite.

On the other hand, according to the determination result of STEP 154, when no travel route candidate satisfying the third correction requisite is present (FIG. 12/NO at STEP 154), the route evaluation element 120 determines whether a travel route candidate satisfying a fourth correction requisite is present or not (FIG. 12/STEP 156). The fourth correction requisite is so defined that the estimated deviation when the robot R is moved to the task execution point with the position or posture thereof corrected at a correction point included in a travel route candidate is equal to or smaller than a threshold which is defined according to the contents of the task.

According to the determination result of STEP 156, when a travel route candidate satisfying the fourth correction requisite is present (FIG. 12/YES at STEP 156), the route evaluation element 120 evaluates the cost of the travel route candidate lower according to the estimated deviation at the correction point in the following way (FIG. 12/STEP 157).

Namely, the greater the estimated deviation at the correction point is, the lower the cost of the travel route candidate satisfying the fourth correction requisite will be evaluated by the route evaluation element 120. The relationship between the estimated deviation and the defined cost is determined with reference to a table specifying the relationship therebetween discontinuously or a map specifying the relationship therebetween continuously, for example.

For example, as illustrated in FIG. 13, among the travel route candidates LC1 to LC3 which do not satisfy the third charge requisite, the cost of the travel route candidates LC2 and LC3 which satisfy the fourth correction requisite are evaluated in such a way that the greater the estimated deviation at the correction point CP is, the lower the cost thereof will be evaluated. Therefore, the travel route candidate LC2 which has a longer travel distance from the starting point PP to the correction point CP and has a greater estimated deviation at the correction point CP is evaluated with a lower cost than the travel route candidate LC3.

On the other hand, when no travel route candidate satisfying the task requisite is present (FIG. 12/NO at STEP 153) according to the determination result of STEP 153, or when no travel route candidate satisfying the fourth correction requisite is present (FIG. 12/NO at STEP 156) according to the determination result of STEP 156, the initial cost of each travel route candidate will not be altered by the route evaluation element 120.

Subsequently, after the first evaluation has been performed on the travel route candidates (FIG. 12/STEP 155, STEP 157 and NO at STEP 153), the route evaluation element 120 determines whether travel route candidates with identical evaluation are present or not (FIG. 12/STEP 158).

According to the determination result of STEP 158, when there are travel route candidates with identical evaluation existed (FIG. 12/YES at STEP 158), the route evaluation element 120 evaluates the travel route candidates according to the length thereof in the following way (FIG. 12/STEP 159). Namely, the shorter the length of a travel route candidate is, the lower the cost thereof will be evaluated by the route evaluation element 120 so that the shortest travel route candidate joining the starting point PP and the terminating point TP has the least cost.

On the other hand, according to the determination result of STEP 158, when no travel route candidate with the identical evaluation is present (FIG. 12/NO at STEP 158), the initial cost of each travel route candidate (obtained from the first evaluation) will not be altered by the route evaluation element 120.

After the secondary evaluation has been performed on the travel route candidates (FIG. 12/STEP 159 and NO at STEP 158), the route evaluation element 120 generates the travel route candidate with the least cost among the travel route candidates as the target route along which the robot R travels autonomously (FIG. 12/STEP 160).

As mentioned above, according to the cost set for each travel route candidate, a travel route candidate where the correction is not needed to be performed can be generated as the target route under consideration of executing the task. When there is no travel route candidate where the correction is not needed to be performed existed, a travel route candidate passing by a correction point can be generated as the target route; and the higher the necessity of correction at the correction point is, the travel route candidate will be mostly generated as the target route.

As described above in detail, according to the target route generation system of the present embodiment, the cost of a travel route candidate including therein an action point is evaluated lower as the necessity for passing by the action point by the robot increases in view of the state of the robot. The travel route candidate with the lowest cost is generated as the target route where the robot travels autonomously. Accordingly, the robot can be made to travel to the terminating point by passing by the action point with a high necessity in view of its state and interacting with the external environment at the action point.

In the aforementioned embodiments from the first one to the fifth, the cost of a travel route candidate is evaluated with a relative difference added thereto by lowering the cost thereof when the necessity for passing by an action point increases. However, it is not limited thereto. The cost of a travel route candidate is evaluated with a relative difference added thereto by increasing the cost thereof when the necessity for passing by an action point is low or there is not need to pass by the action point. For example, it is acceptable that a position of an object (obstacle) and a size thereof may be memorized as an action point and the cost of a travel route candidate passing by the object (the object is served as the action point with no necessity to be passed by) is increased.

In the drawings for the aforementioned embodiments of the first one to the fifth (FIG. 5, FIG. 7, FIG. 9, FIG. 11 and FIG. 13), the travel route candidates LC1 to LC3 joining the starting point PP and the terminating point TP are separate routes. However, it is not limited thereto. The travel route candidates LC1 to LC3 may have partial overlapped portions in the routes. Specifically, a travel route candidate may have a common portion overlapped with the other travel route candidates and the left portion (non-common portion) may be independent.

It is acceptable to add a condition that the estimated residual capacity of battery is in an allowable capacity range in the determination of the first and the second charge requisites according to the first embodiment, or in the determination of the third and the fourth charge requisites according to the fourth embodiment. Accordingly, a travel route candidate whose estimated residual capacity of battery might go beyond the allowable capacity range can be prevented from being evaluated.

In the aforementioned embodiments from the first one to the fifth, it is configured that the route candidate generation element 110, the residual capacity estimation element 115, the power consumption estimation element 116, the deviation estimation element 117 and the task recognition element 118 which are served as the state recognition elements, and the route evaluation element 120 are disposed in the controller of the robot R, and the link storing element 211 and the action point storing element 212 are disposed in the link information storing element 210 of the support server 200. However, the configuration may be altered appropriately. It is acceptable that a part of or the entire part of the elements are disposed in the controller 100 of the robot R and the left elements are disposed in the support server 200.

What is claimed is:

1. A target route generation system configured to generate a target route for a robot to travel along autonomously, comprising:
   a link storing element configured to store travelable links in a travel region for the robot;
   an action point storing element configured to store an action point between the robot and an external environment thereof in any of the links stored in the link storing element;
   a starting point recognition element configured to recognize a present position or departure position of the robot in the travel region as a starting point;

a terminating point recognition element configured to recognize a destination position of the robot specified by a user in the travel region via an input device as a terminating point;

a route candidate generation element configured to generate a plurality of travel route candidates which join the terminating point recognized by the terminating point recognition element and the starting point recognized by the starting point recognition element by way of joining links stored in the link storing element;

a state recognition element configured to recognize a state of the robot; and a route evaluation element configured to evaluate lower a cost of a travel route candidate including therein an action point stored in the action point storing element among the plurality of travel route candidates generated by the route candidate generation element as the necessity for passing by the action point increases in view of the state of the robot recognized by the state recognition elements, or to evaluate the cost thereof higher as the necessity decreases;

the travel route candidate with the lowest total cost evaluated by the route evaluation element is generated as the target route wherein at least a position or posture correction point for the robot is included in the action point stored in the action point storing element, the state recognition element recognizes an estimated deviation of a position or posture of the robot from a target position or posture thereof in relation to a travel distance to be traveled by the robot along the travel route candidate as the state of the robot, the route evaluation element evaluates the cost of a travel route candidate which satisfies a first correction requisite lower than the cost of the other travel route candidates which do not satisfy the first correction requisite according to the recognition result by the state recognition element: and the first correction requisite is so defined that the estimated deviation when the robot is moved to the terminating point with the position or posture thereof uncorrected is equal to or smaller than a threshold.

2. The target route generation system according to claim 1, wherein the route evaluation element evaluates the cost of a travel route candidate which does not satisfy the first correction requisite but satisfies a second correction requisite lower than the cost of the other travel route candidates which do not satisfy the second correction requisite according to the recognition result by the state recognition element; and the second correction requisite is so defined that the estimated deviation when the robot is moved to the terminating point becomes equal to or smaller than the threshold after the position or posture thereof is corrected at a correction point included in the travel route candidate.

3. The target route generation system according to claim 2, wherein the greater the estimated deviation at the correction point is, the lower the route evaluate element evaluates the cost of the travel route candidate satisfying the second correction requisite according to the recognition result by the state recognition element.

4. The target route generation system according to claim 1, wherein at least a task execution point for the robot is stored in the action point storing element as the action point;

the state recognition element recognizes a task information denoting at least a task execution point where a task is being executed or is scheduled to be executed by the robot as the state of the robot; and the route evaluation element evaluates the cost of a travel route candidate which satisfies a task requisite that a task execution point is included therein lower than the cost of the other travel route candidates which do not satisfy the task requisite according to the recognition result by the state recognition element.

5. The target route generation system according to claim 1, wherein at least a battery charging point and a task execution point for the robot are stored in the action point storing element as the action point;

the state recognition element recognizes an estimated residual capacity of battery in relation to a travel distance to be traveled by the robot along the travel route candidate and a task information denoting at least a task execution point where a task is being executed or is scheduled to be executed by the robot as the state of the robot;

the route evaluation element evaluates the cost of a travel route candidate which satisfies a third charge requisite lower than the cost of the other travel route candidates which do not satisfy the third charge requisite according to the recognition result by the state recognition element; and the third charge requisite is so defined that the estimated residual capacity of battery used to move the robot to the task execution point with the battery thereof uncharged is equal to or greater than a threshold which is defined according to the contents of the task.

6. The target route generation system according to claim 5, wherein the route evaluation element evaluates the cost of a travel route candidate which does not satisfy the third charge requisite but satisfies a fourth charge requisite lower than the cost of the other travel route candidates which do not satisfy the fourth charge requisite according to the recognition result by the state recognition element; and the fourth charge requisite is so defined that the estimated residual capacity of battery used to move the robot to the task execution point becomes equal to or greater than the threshold after the battery is charged at a battery charging point included in the travel route candidate.

7. The target route generation system according to claim 6, wherein the less the estimated residual capacity of battery at the battery charging point is, the lower the route evaluate element evaluates the cost of the travel route candidate satisfying the fourth charge requisite according to the recognition result by the state recognition element.

8. A target route generation system configured to generate a target route for a robot to travel along autonomously, comprising:

a link storing element configured to store travelable links in a travel region for the robot;

an action point storing element configured to store an action point between the robot and an external environment thereof in any of the links stored in the link storing element;

a starting point recognition element configured to recognize a present position or departure position of the robot in the travel region as a starting point;

a terminating point recognition element configured to recognize a destination position of the robot specified by a user in the travel region via an input device as a terminating point;

a route candidate generation element configured to generate a plurality of travel route candidates which join the terminating point recognized by the terminating point recognition element and the starting point recognized by the starting point recognition element by way of joining links stored in the link storing element;

a state recognition element configured to recognize a state of the robot; and a route evaluation element configured to evaluate lower a cost of a travel route candidate including therein an action point stored in the action point storing element among the plurality of travel route candidates generated by the route candidate generation element as the necessity for passing by the action point increases in view of the state of the robot recognized by the state recognition elements, or to evaluate the cost thereof higher as the necessity decreases;

the travel route candidate with the lowest total cost evaluated by the route evaluation element is generated as the target route: wherein at least a position or posture correction point and a task execution point for the robot is stored in the action point storing element as the action point;

the state recognition element recognizes an estimated deviation of a position or posture of the robot from a target position or posture thereof in relation to a travel distance to be traveled by the robot along the travel route candidate and a task information denoting at least a task execution point where a task is being executed or is scheduled to be executed by the robot as the state of the robot;

the route evaluation element evaluates the cost of a travel route candidate which satisfies a third correction requisite lower than the cost of the other travel route candidates which do not satisfy the third charge requisite according to the recognition result by the state recognition element; and the third correction requisite is so defined that the estimated deviation when the robot is moved to the task execution point with the position or posture thereof uncorrected is equal to or smaller than a threshold which is defined according to the contents of the task.

9. The target route generation system according to claim 8, wherein
the route evaluation element evaluates the cost of a travel route candidate which does not satisfy the third correction requisite but satisfies a fourth correction requisite lower than the cost of the other travel route candidates which do not satisfy the fourth correction requisite according to the recognition result by the state recognition element; and the fourth correction requisite is so defined that the estimated deviation when the robot is moved to the task execution point becomes equal to or smaller than the threshold after the position or posture of the robot is corrected at a correction point included in the travel route candidate.

10. The target route generation system according to claim 9, wherein the greater the estimated deviation at the correction point is, the lower the route evaluate element evaluates the cost of the travel route candidate satisfying the fourth correction requisite according to the recognition result by the state recognition element.

11. The target route generation system according to claim 1, wherein:
a part of or the entire part of the link storing element, the action point storing element, the starting point recognition element, the terminating point recognition element, the route candidate generation element, the state recognition element and the route evaluation element are disposed in the robot, and the other elements which are not disposed in the robot are disposed in a support server which provides information to the robot through communication with the robot.

12. The target route generation system according to clam 8, wherein: a part of or the entire part of the link storing element, the action point storing element, the starting point recognition element, the terminating point recognition element, the route candidate generation element, the state recognition element and the route evaluation element are disposed in the robot, and the other elements which are not disposed in the robot are disposed in a support server which provides information to the robot through communication with the robot.

* * * * *